US008861757B2

(12) United States Patent
Korn

(10) Patent No.: US 8,861,757 B2

(45) Date of Patent: Oct. 14, 2014

(54) APPARATUS AND METHOD FOR CALCULATING DRIVING COEFFICIENTS FOR LOUDSPEAKERS OF A LOUDSPEAKER ARRANGEMENT AND APPARATUS AND METHOD FOR PROVIDING DRIVE SIGNALS FOR LOUDSPEAKERS OF A LOUDSPEAKER ARRANGEMENT BASED ON AN AUDIO SIGNAL ASSOCIATED WITH A VIRTUAL SOURCE

(75) Inventor: Thomas Korn, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 370 days.

(21) Appl. No.: 13/461,818

(22) Filed: May 2, 2012

(65) Prior Publication Data

US 2012/0237063 A1 Sep. 20, 2012

Related U.S. Application Data

(63) Continuation of application No. PCT/EP2010/066729, filed on Nov. 3, 2010.

(60) Provisional application No. 61/257,949, filed on Nov. 4, 2009.

(51) Int. Cl.

| | |
|---|---|
| ***H04R 5/02*** | (2006.01) |
| ***H04B 3/00*** | (2006.01) |
| ***H04R 3/02*** | (2006.01) |
| ***H04R 5/00*** | (2006.01) |
| ***H04R 29/00*** | (2006.01) |
| ***H04S 3/00*** | (2006.01) |

(52) U.S. Cl.

CPC ............ *H04S 3/002* (2013.01); *H04S 2400/09* (2013.01); *H04S 2420/13* (2013.01)

USPC ............. 381/304; 381/77; 381/73.1; 381/80; 381/310; 381/17; 381/59

(58) Field of Classification Search

USPC .................................. 381/304, 310, 300, 59

See application file for complete search history.

(56) References Cited

U.S. PATENT DOCUMENTS

| | | | | |
|---|---|---|---|---|
| 7,684,578 | B2 | 3/2010 | Roeder et al. | |
| 2005/0163329 | A1 | 7/2005 | Dickey | |
| 2006/0098830 | A1* | 5/2006 | Roeder et al. | 381/310 |
| 2009/0097666 | A1 | 4/2009 | Kim et al. | |
| 2011/0135124 | A1* | 6/2011 | Steffens et al. | 381/300 |

FOREIGN PATENT DOCUMENTS

| | | | |
|---|---|---|---|
| EP | 2 056 627 | A1 | 5/2009 |
| WO | 2006/089682 | A1 | 8/2006 |

OTHER PUBLICATIONS

Official Communication issued in International Patent Application No. PCT/EP2010/066729, mailed on May 18, 2011.

Berkhout et al., "Acoustic Control by Wave Field Synthesis," J. Acoust. Soc. Am. 93 (5), May 1993, pp. 2764-2778.

(Continued)

*Primary Examiner* — Duc Nguyen

*Assistant Examiner* — Yogeshkumar Patel

(74) *Attorney, Agent, or Firm* — Keating & Bennett, LLP

(57) ABSTRACT

An apparatus for calculating driving coefficients for loudspeakers of a loudspeaker arrangement for an audio signal associated with a virtual source is described.

33 Claims, 14 Drawing Sheets

(56) References Cited

OTHER PUBLICATIONS

De Bruijn et al., "Subjective Experiments on the Effect of Combining Spatialized Audio and 2D Video Projection in Audio-Visual Systems," AES 112th Convention, Convention Paper 5582, May 10-13, 2002, Munich, Germany, pp. 1-11.
Reiter et al., "Automatisierte Anpassung der Akustik an Virtuelle Raume," 46th International Scientific Colloquium, Sep. 24-27, 2001, 4 pages.
Verheijen, "Sound Reproduction by Wave Field Synthesis," Technische Universiteit Delft, 1997, 188 pages.
Pulkki, "Virtual Sound Source Positioning Using Vector Base Amplitude Panning," J. Audio Eng. Soc., vol. 45, No. 6, Jun. 1997, pp. 456-466.
Jansen, "Focused Wavefields and Moving Virtual Sources by Wavefield Synthesis," Laboratory of Seismics and Acoustics, Department of Applied Physics, Delft University of Technology, Aug. 1997, 106 pages.
Korn, "A Graphical Tool Set for Analyzing Wave Field Synthesis Algorithms," AES 124th Convention, Convention Papers 7364, May 17-20, 2008, Amsterdam, The Netherlands, pp. 1-8.
Kinsler et al., "Fundamentals of Acoustics 4th Edition," John Wiley & Sons, Inc., 2000, pp. 188-193.
Klehs et al., "Wave Field Synthesis in the Real World: Part 1—In the Living Room," AES 114th Convention, Convention Paper 5727, Mar. 22-25, 2003, Amsterdam, The Netherlands, pp. 1-15.
Sontacchi et al., "Audio Interface for Immersive 3D-Audio Desktop Applications," International Symposium on Virtual Environments, Human-Computer Interfaces, and Measurement Systems, Jul. 27-29, 2003, Lugano, Switzerland, pp. 179-182.
Corteel et al., "Wave Field Synthesis with Increased Aliasing Frequency," AES 124th Convention, Convention Paper 7362, May 17-20, 2008, Amsterdam, The Netherlands, pp. 1-10.

* cited by examiner

APPARATUS AND METHOD FOR CALCULATING DRIVING COEFFICIENTS FOR LOUDSPEAKERS OF A LOUDSPEAKER ARRANGEMENT AND APPARATUS AND METHOD FOR PROVIDING DRIVE SIGNALS FOR LOUDSPEAKERS OF A LOUDSPEAKER ARRANGEMENT BASED ON AN AUDIO SIGNAL ASSOCIATED WITH A VIRTUAL SOURCE

CROSS-REFERENCE TO RELATED APPLICATIONS

This application is a continuation of copending International Application No. PCT/EP2010/066729, filed Nov. 3, 2010, which is incorporated herein by reference in its entirety, and additionally claims priority from U.S. Application No. 61/257,949, filed Nov. 4, 2009, which is incorporated herein by reference in its entirety.

The present invention relates to the field of audio signal processing, and particularly to an apparatus and a method for calculating driving coefficients for loudspeakers of a loudspeaker arrangement and an apparatus and a method for providing drive signals for loudspeakers of a loudspeaker arrangement.

BACKGROUND OF THE INVENTION

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel loudspeaker reproduction of audio signals have been known and standardized for many years. All usual techniques have the disadvantage that both the site of the loudspeakers and the position of the listener are already impressed on the transfer format. With wrong arrangement of the loudspeakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave field synthesis (WFS), have been studied at the TU Delft and first presented in the late 80s (Berkout, A. J.; de Vries, D.; Vogel, P.: Acoustic Control by Wave Field Synthesis. JASA 93, 993).

Due to this method's enormous demands on computer power and transfer rates, the wave field synthesis has up to now only rarely been employed in practice. Only the progress in the area of the microprocessor technology and the audio encoding do permit the employment of this technology in concrete applications today.

The basic idea of WFS is based on the application of Huygens' principle of the wave theory. Each point caught by a wave is starting point of an elementary wave propagating in spherical or circular manner.

Applied on acoustics, every arbitrary shape of an incoming wave front may be replicated by a large amount of loudspeakers arranged next to each other (a so-called loudspeaker array). In the simplest case, a single point source to be reproduced and a linear arrangement of the loudspeakers, the audio signals of each loudspeaker have to be fed with a time delay and amplitude scaling so that the radiating sound fields of the individual loudspeakers overlay correctly. With several sound sources, for each source the contribution to each loudspeaker is calculated separately and the resulting signals are added. If the sources to be reproduced are in a room with reflecting walls, reflections also have to be reproduced via the loudspeaker array as additional sources. Thus, the expenditure in the calculation strongly depends on the number of sound sources, the reflection properties of the recording room, and the number of loudspeakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real loudspeaker array and the listener.

Although the wave field synthesis functions are well for environments the properties of which are known, irregularities occur if the property changes or the wave field synthesis is executed on the basis of an environment property not matching the actual property of the environment.

The technique of the wave field synthesis, however; may also be advantageously employed to supplement a visual perception by a corresponding spatial audio perception. Previously, in the production in virtual studios, the conveyance of an authentic visual impression of the virtual scene was in the foreground. The acoustic impression matching the image is usually impressed on the audio signal by manual steps in the so-called postproduction afterwards or classified as too expensive and time-intensive in the realization and thus neglected. Thereby, usually a contradiction of the individual sensations arises, which leads to the designed space, i.e. the designed scene, to be perceived as less authentic.

In the technical publication "Subjective experiments on the effects of combining spatialized audio and 2D video projection in audio-visual systems", W. de Bruijn and M. Boone, AES convention paper 5582, May 10 to 13, 2002, Munich, subjective experiments with reference to effects of combining spatial audio and a two-dimensional video projection in audiovisual systems are illustrated. In particular, it is stressed that two speakers standing at differing distance to a camera and almost standing behind each other can be better understood by a viewer if the two people standing behind each other are seen and reconstructed as different virtual sound sources with the aid of the wave field synthesis. In this case, by subjective tests, it has turned out that a listener can better understand and distinguish the two speakers, who are talking at the same time, separately from each other.

In a conference contribution to the 46th international scientific colloquium in Ilmenau from Sep. 24 to 27, 2001, entitled "Automatisierte Anpassung der Akustik an virtuelle Räume", U. Reiter, F. Melchior, and C. Seidel, an approach to automate tone postproduction processes is presented. To this end, the parameters of a film set that may be used for the visualization, such as room size, texture of the surfaces or camera position, and position of the actors, are checked for their acoustic relevance, whereupon corresponding control data is generated. This then influences, in automated manner, the effect and postproduction processes employed for postproduction, such as the adaptation of the speaker volume dependence on the distance to the camera, or the reverberation time in dependence on room size and wall texture. Here, the aim is to increase the visual impression of a virtual scene for heightened perception of reality.

"Hearing with the ears of the camera" is to be enabled, in order to make a scene appear more real. Here, an as high as possible correlation between sound event location in the picture and hearing event location in the surround field is strived for. This means that sound source positions are supposed to be adapted to the picture. Camera parameters, such as zoom, are also to be included into the tone design, just as a position of two loudspeakers L and R. To this end, tracking data of a virtual studio are written into a file together with an accompanying time code by the system. At the same time, picture, tone, and time code are recorded on a MAZ. The camdump file is transferred to a computer generating control data for an audio workstation therefrom and outputting it synchronously to the picture originating from the MAZ via a MIDI interface. The actual audio processing, such as positioning of the sound source in the surround field and inserting early reflections and reverberation, takes place within the audio workstation. The signal is rendered for a 5.1 surround loudspeaker system.

Camera tracking parameters, just like positions of sound sources in the capture setting, may be recorded in real movie sets. Such data may also be generated in virtual studios.

In a virtual studio, an actor or presenter stands alone in a recording room. In particular, he or she stands in front of a blue wall, also referred to as blue box or blue panel. Onto this blue wall, a pattern of blue and light-blue strips is applied. The special thing about this pattern is that the strips are of different width, and thus a multiplicity of strip combinations result. Due to the unique strip combinations on the blue wall, in postproduction, when the blue wall is replaced by a virtual background, it is possible to exactly determine in which direction the camera is looking. With the aid of this information, the computer may determine the background for the current camera viewing angle. Furthermore, sensors from the camera sensing and outputting additional camera parameters are evaluated. Typical parameters of a camera sensed by means of sensors are the three degrees of translation x, y, z, the three degrees of rotation, also referred to as roll, tilt, pan, and the focal length or zoom, which is of equal meaning with the information on the aperture angle of the camera.

So that the exact position of the camera may also be determined without image recognition and without expensive sensor technology, also a tracking system may be employed, which consists of several infrared cameras determining the position of an infrared sensor mounted to the camera. Thus, also the position of the camera is determined. With the camera parameters provided by the sensor technology and the strip information evaluated by the image recognition, a real-time computer may now compute the background for the current picture. Hereupon, the blue hue, which the blue background had, is removed from the picture, so that the virtual background is played in instead of the blue background.

In the majority of cases, a concept is followed, in which it is all about getting an acoustic overall impression of the visually imaged scenery. This may be well described with the term of the "full shot" originating from image design. This "full shot" sound impression mostly remains constant over all shots in a scene, although the optical angle of view on the things mostly changes strongly. Thus, optical details are highlighted by corresponding shots or put to the background. Counter shots in the movie dialog design are also not reenacted by the tone.

Hence, there is the need to acoustically embed the viewer into an audiovisual scene. Here, the screen or image area forms the viewing direction and the angle of view of the viewer. This means that the tone is to track the image in the form that it matches the scene image. In particular, this becomes even more important for virtual studios, since there is typically no correlation between the tone of, for example, the presentation and the surrounding in which the presenter currently is. In order to get an audiovisual overall impression of the scene, a spatial impression matching the image rendered has to be simulated. A substantial subjective property in such a sound concept in this connection is the location of a sound source, as a viewer of a movie screen perceives it, for example.

In the audio field, by the technique of the wave field synthesis (WFS), good spatial sound for a large listener area can be accomplished. As it has been set forth, the wave field synthesis is based on the Huygens principle, according to which wave fronts may be shaped and built up by superimposition of elementary waves. According to a mathematically exact, theoretical description, an infinite number of sources in infinitely small distance would have to be used for the generation of the elementary waves. In practice, however, a finite number of loudspeakers is used in a finite, small distance to each other. Each of these loudspeakers is controlled with an audio signal from a virtual source having a certain delay and a certain level, according to the WFS principle. Levels and delays are usually different for all loudspeakers.

At is has already been set forth, the wave field synthesis system works on the basis of the Huygens principle and reconstructs a given waveform, for example, of a virtual source arranged at a certain distance to a presentation area or a listener in the presentation area by a multiplicity of individual waves. The wave field synthesis algorithm thus obtains information on the actual position of an individual loudspeaker from the loudspeaker array to then calculate, for this individual loudspeaker, a component signal this loudspeaker then finally has to irradiate, so that a superimposition of the loudspeaker signal from the one loudspeaker with the loudspeaker signals of the other active loudspeakers performs a reconstruction in that the listener has the impression that he or she is not "irradiated with sound" by many individual loudspeakers, but only by a single loudspeaker at the position of the virtual source.

For several virtual sources in a wave field synthesis setting, the contribution of each virtual source for each loudspeaker, i.e. the component signal of the first virtual source for the first loudspeaker, of the second virtual source for the first loudspeaker, etc., is calculated to then add the component signals to finally obtain the actual loudspeaker signal. In case of, for example, three virtual sources, the superimposition of the loudspeaker signals of all active loudspeakers at the listener would lead to the listener not having the impression that he or she is irradiated with sound from a large array of loudspeakers, but that the sound he or she is hearing only comes from three sound sources positioned at special positions, which are equal to the virtual sources.

In practice, the calculation of the component signals mostly takes place by the audio signal associated with a virtual source being imparted with a delay and a scaling factor at a certain time instant, depending on position of the virtual source and position of the loudspeaker, in order to obtain a delayed and/or scaled audio signal of the virtual source, which immediately represents the loudspeaker signal, when only one virtual source is present, or which then contributes to the loudspeaker signal for the loudspeaker considered, after addition with further component signals for the loudspeaker considered from other virtual sources.

Typical wave field synthesis algorithms work independently of how many loudspeakers are present in the loudspeaker array. The theory underlying the wave field synthesis consists in the fact that each arbitrary sound field may be exactly reconstructed by an infinitely high number of individual loudspeakers, the individual loudspeakers being arranged infinitely close to each other. In practice, however, neither the infinitely high number nor the infinitely close arrangement can be realized. Instead, there are a limited number of loudspeakers, which are additionally arranged in certain given distances to each other. With this, in real systems, only an approximation is achieved to the actual waveform that would take place if the virtual source was actually present, i.e. was a real source.

Furthermore, there are various scenarios in that the loudspeaker array, when considering a movie theater, is only arranged, for example, on the side of the movie screen. In this case, the wave field synthesis module would generate loudspeaker signals for these loudspeakers, wherein the loudspeaker signals for these loudspeakers will normally be the same as for corresponding loudspeakers in a loudspeaker array not only extending across the side of a movie theater, for example, on which the screen is arranged, but which is also arranged to the left, to the right, and behind the audience room. This "360°" loudspeaker array will of course provide a better approximation to an exact wave field than only a one-sided array, for example in front of the viewers. Nevertheless, the loudspeaker signals for the loudspeakers that are in front of the viewers are the same in both cases. This means that a wave field synthesis module typically does not obtain feedback as to how many loudspeakers are present or whether it is a one-sided or multi-sided or even a 360° array or not. In other words, a wave field synthesis means calculates a loudspeaker signal for a loudspeaker due to the position of the loudspeaker and independent of the fact which further loudspeakers are also present or not present.

For example, the U.S. Pat. No. 7,684,578 describes a wave field synthesis apparatus for a reduction of artifacts by supplying not all loudspeakers of the loudspeaker array with drive signal components. It shows the determination of relevant loudspeakers and a calculation of drive signal components only for the relevant loudspeakers.

In general, the reduction or elimination of artifacts caused by different effects is very important.

SUMMARY

According to an embodiment, an apparatus for calculating driving coefficients for loudspeakers of a loudspeaker arrangement for an audio signal associated with a virtual source may have: a multi-channel renderer configured to calculate first subdriving coefficients for loudspeakers of the loudspeaker arrangement according to a first calculation rule, configured to calculate second subdriving coefficients for the same loudspeakers according to a second calculation rule and configured to calculate driving coefficients for the same loudspeakers based on the first subdriving coefficients and the second subdriving coefficients, if a position of the virtual source is located within an inner area of a loudspeaker transition zone, wherein the multi-channel renderer is configured to calculate second subdriving coefficients for loudspeakers of the loudspeaker arrangement according to the second calculation rule, configured to calculate third subdriving coefficients for the same loudspeakers according to a third calculation rule and configured to calculate driving coefficients for the same loudspeakers based on the second subdriving coefficients and the third subdriving coefficients, if a position of the virtual source is located within an outer area of the loudspeaker transition zone, wherein the second calculation rule is different from the first calculation rule and the third calculation rule, wherein the second calculation rule includes an amplitude panning algorithm, wherein the transition zone separates an inner zone of the loudspeaker arrangement and an outer zone of the loudspeaker arrangement, wherein the loudspeakers of the loudspeaker arrangement are located within the transition zone.

According to another embodiment, a method for calculating coefficients for loudspeakers of a loudspeaker arrangement for an audio signal associated with a virtual source may have the steps of: calculating first subdriving coefficients for loudspeakers of the loudspeaker arrangement according to a first calculation rule, calculating second subdriving coefficients for the same loudspeakers according to a second calculation rule and calculating driving coefficients for the same loudspeakers based on the first subdriving coefficients and the second subdriving coefficients, if a position of the virtual source is located within an inner area of a loudspeaker transition zone; and calculating second subdriving coefficients for loudspeakers of the loudspeaker arrangement according to the second calculation rule, calculating third subdriving coefficients for the same loudspeakers according to a third calculation rule and calculating driving coefficients for the same loudspeakers based on second subdriving coefficients and the third subdriving coefficients, if a position of the virtual source is located within an outer area of the loudspeaker transition zone, wherein the second calculation rule is different from the first calculation rule and the third calculation rule, wherein the second calculation rule includes an amplitude panning algorithm, wherein the loudspeaker transition zone separates an inner zone of the loudspeaker arrangement and an outer zone of the loudspeaker arrangement, wherein the loudspeakers of the loudspeaker arrangement are located within the loudspeaker transition zone.

Another embodiment may have a computer program where the program code for performing the method for calculating coefficients for loudspeakers of a loudspeaker arrangement for an audio signal associated with a virtual source which method may have the steps of: calculating first subdriving coefficients for loudspeakers of the loudspeaker arrangement according to a first calculation rule, calculating second subdriving coefficients for the same loudspeakers according to a second calculation rule and calculating driving coefficients for the same loudspeakers based on the first subdriving coefficients and the second subdriving coefficients, if a position of the virtual source is located within an inner area of a loudspeaker transition zone; and calculating second subdriving coefficients for loudspeakers of the loudspeaker arrangement according to the second calculation rule, calculating third subdriving coefficients for the same loudspeakers according to a third calculation rule and calculating driving coefficients for the same loudspeakers based on second subdriving coefficients and the third subdriving coefficients, if a position of the virtual source is located within an outer area of the loudspeaker transition zone, wherein the second calculation rule is different from the first calculation rule and the third calculation rule, wherein the second calculation rule includes an amplitude panning algorithm, wherein the loudspeaker transition zone separates an inner zone of the loudspeaker arrangement and an outer zone of the loudspeaker arrangement, wherein the loudspeakers of the loudspeaker arrangement are located within the loudspeaker transition zone, wherein the computer program runs on a computer or a microcontroller.

According to another embodiment, an apparatus for providing drive signals for loudspeakers of a loudspeaker arrangement based on an audio signal associated with a virtual source may have: a loudspeaker determiner configured to determine a group of relevant loudspeakers of the loudspeaker arrangement located within a variable angular range around a position of a virtual source, wherein the variable angular range is defined by a distance between the position of the virtual source and a predefined listener position, wherein the variable angular range is defined by a first angle having a vertex at a first position of the virtual source for a first distance between the first position of the virtual source and the predefined listener position and by a second angle having a vertex at a second position of the virtual source for a second distance between the second position of the virtual source and the predefined listener position, wherein the first distance is different from the second distance, and wherein the first angle has a first angle value and the second angle has a second angle value, wherein the first value is different from the second value, wherein the virtual source is a focused virtual source located within an inner area of the loudspeaker arrangement; and a multi-channel renderer configured to calculate driving coefficients for the determined group of relevant loudspeakers, wherein the multi-channel renderer is configured to provide drive signals to the group of relevant loudspeakers based on the calculated driving coefficients and the audio signal of the virtual source without providing drive signals of the virtual source to other loudspeakers than the loudspeakers of the group of relevant loudspeakers.

According to another embodiment, a method for providing drive signals for loudspeakers of a loudspeaker arrangement based on an audio signal associated with a virtual source may have the steps of: determining a group of relevant loudspeakers of the loudspeaker arrangement located within a variable angular range around a position of the virtual source, wherein the variable angular range is based on a distance between the position of the virtual source and a predefined listener position wherein the variable angular range is defined by a first angle having a vertex at a first position of the virtual source for a first distance between the first position of the virtual source and the predefined listener position and by a second angle having a vertex at a second position of the virtual source for a second distance between the second position of the virtual source and the predefined listener position, wherein the first distance is different from the second distance, and wherein the first angle has a first angle value and the second angle has a second angle value, wherein the first value is different from the second value, wherein the virtual source is a focused virtual source located within an inner area of the loudspeaker arrangement; calculating driving coefficients for the determined group of relevant loudspeakers; and providing drive signals to the group of relevant loudspeakers based on the calculated driving coefficients and the audio signal of the virtual source without providing drive signals of the virtual source to other loudspeakers than the loudspeakers of the group of relevant loudspeakers.

Another embodiment may have a computer program with a program code for performing the method for providing drive signals for loudspeakers of a loudspeaker arrangement based on an audio signal associated with a virtual source, which method may have the steps of: determining a group of relevant loudspeakers of the loudspeaker arrangement located within a variable angular range around a position of the virtual source, wherein the variable angular range is based on a distance between the position of the virtual source and a predefined listener position wherein the variable angular range is defined by a first angle having a vertex at a first position of the virtual source for a first distance between the first position of the virtual source and the predefined listener position and by a second angle having a vertex at a second position of the virtual source for a second distance between the second position of the virtual source and the predefined listener position, wherein the first distance is different from the second distance, and wherein the first angle has a first angle value and the second angle has a second angle value, wherein the first value is different from the second value, wherein the virtual source is a focused virtual source located within an inner area of the loudspeaker arrangement; calculating driving coefficients for the determined group of relevant loudspeakers; and providing drive signals to the group of relevant loudspeakers based on the calculated driving coefficients and the audio signal of the virtual source without providing drive signals of the virtual source to other loudspeakers than the loudspeakers of the group of relevant loudspeakers, when the computer program runs on a computer or a microcontroller.

According to an aspect of the present invention, an apparatus for calculating driving coefficients of loudspeakers of a loudspeaker arrangement for an audio signal associated with a virtual source is provided. The apparatus comprises a multi-channel renderer configured to calculate first subdriving coefficients for loudspeakers of the loudspeaker arrangement according to a first calculation rule, configured to calculate second subdriving coefficients for the same loudspeakers according to a second calculation rule and configured to calculate driving coefficients for the same loudspeakers based on the first subdriving coefficients and the second subdriving coefficients, if a position of the virtual source is located within an inner area of a loudspeaker transition zone. Further, the multi-channel renderer is configured to calculate second subdriving coefficients for loudspeakers of the loudspeaker arrangement according to the second calculation rule, configured to calculate third subdriving coefficients for the same loudspeakers according to a third calculation rule and configured to calculate driving coefficients for the same loudspeakers based on the second subdriving coefficients and the third subdriving coefficients, if a position of the virtual source is located within an outer area of the loudspeaker transition zone. The second calculation rule is different from the first calculation rule and different from the third calculation rule. The loudspeaker transition zone separates an inner zone of the loudspeaker arrangement and an outer zone of the loudspeaker arrangement. Further, the loudspeakers of the loudspeaker arrangement are located within the loudspeaker transition zone.

By calculating different subdriving coefficients based on different calculation rules for determining driving coefficients for a loudspeaker, the different perceptual behavior of a virtual source located outside the loudspeaker arrangement and inside the loudspeaker arrangement especially in the proximity of the loudspeakers of the loudspeaker arrangement can be taken into account. By combining the different subdriving coefficients, artifacts due to discontinuities during a transition of the virtual source from outside the loudspeaker arrangement to inside the loudspeaker arrangement or at the border of the transition zone can be significantly reduced and in this way the audio quality can be improved.

According to another aspect of the invention, an apparatus for calculating driving coefficients for loudspeakers of a loudspeaker arrangement for an audio signal associated with a virtual source is provided. The apparatus comprises a multi-channel renderer configured to calculate driving coefficients for loudspeakers of the loudspeaker arrangement based on a first calculation rule, if a position of the virtual source is located outside a loudspeaker transition zone. Further, the multi-channel renderer is configured to calculate driving coefficients for loudspeakers of the loudspeaker arrangement based on a second calculation rule, if the position of the virtual source is located within the loudspeaker transition zone. A border of the loudspeaker transition zone comprises a minimal distance to a loudspeaker of the loudspeaker arrangement depending on a distance between the loudspeaker and a loudspeaker adjacent to this loudspeaker. Further, the loudspeaker arrangement comprises at least two pairs of adjacent loudspeakers with different distances between the loudspeakers of the respective pair of loudspeakers.

By using a variable width of the loudspeaker transition zone separating an inner zone of the loudspeaker arrangement and an outer zone of the loudspeaker arrangement the different behavior of the audio signals of a virtual source located between two loudspeakers far away from each other and two loudspeakers positioned close to each other can be taken into account. Therefore, artifacts due to different distances of adjacent loudspeakers can be reduced and the audio quality can be improved.

According to a further aspect of the invention, an apparatus for providing drive signals for loudspeakers of a loudspeaker arrangement based on an audio signal associated with a virtual source is provided. The apparatus comprises a loudspeaker determiner and a multi-channel renderer. The loudspeaker determiner is configured to determine a group of relevant loudspeakers of the loudspeaker arrangement located within a variable angular range around a position of the virtual source. The variable angular range is based on a distance between the position of the virtual source and a predefined listener position. The multi-channel renderer is configured to calculate driving coefficients for the determined group of relevant loudspeakers. Further, the multi-channel renderer is configured to provide drive signals to the group of relevant loudspeakers based on the calculated driving coefficients and the audio signal without providing drive signals of the virtual source to other loudspeakers than the loudspeakers of the group of relevant loudspeakers.

By adjusting the angular range of active loudspeakers based on a distance of the position of the virtual source and a predefined listener position, artifacts due to virtual sources moving through the predefined listener position or moving close to the predefined listener position can be reduced and the audio quality can be improved. For example, if the virtual source moves to the predefined listener position, the variable angular range gets larger and larger until it reaches full 360°, when the virtual source reaches the predefined listener position.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
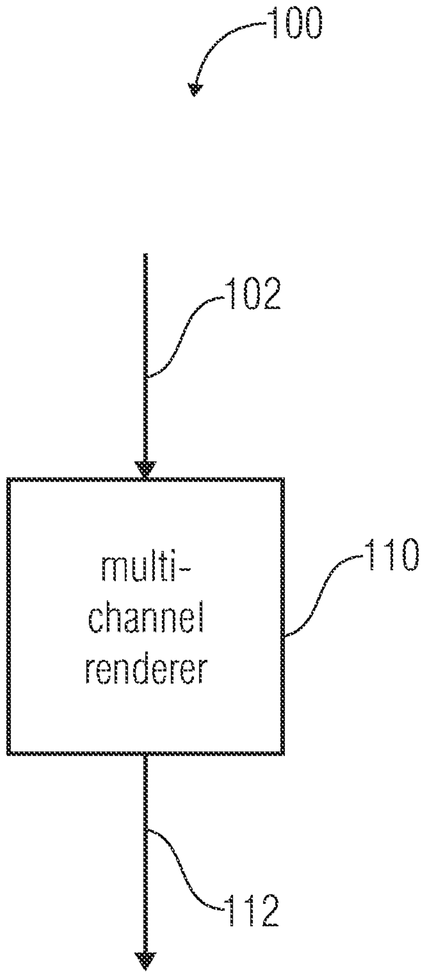
FIG. 1 is a block diagram of an apparatus for calculating driving coefficients for loudspeakers of a loudspeaker arrangement.

In the following, the same reference numerals are partly used for objects and functional units having the same or similar functional properties and the description thereof with regard to a figure shall apply also to other figures in order to reduce redundancy in the description of the embodiments.

The following embodiments describe concepts for calculating drive coefficients for loudspeakers or for generating drive signals for loudspeakers based on driving coefficients. These driving coefficients may also be called filter coefficients. A driving coefficient or a filter coefficient of the loudspeaker may be a scaling parameter or a delay parameter of an audio signal or an audio object to be reproduced by the loudspeaker arrangement. For example, for a virtual source, a scaling parameter is calculated as a driving filter coefficient and a delay parameter is calculated as a second driving coefficient for a loudspeaker of the loudspeaker arrangement. The scaling parameter may also be called amplitude parameter.

An audio object may represent an audio source as for example a car, a train, a raindrop or a speaking person, wherein the virtual source position of an audio object may be for example an absolute position or a relative position in relation to the loudspeaker arrangement (e.g. a coordinate origin may be predefined). An audio object may be assumed to be a point source emitting spherical waves located at the virtual source position. For audio objects located far away from the loudspeaker arrangement, the spherical wave may be approximated by a plane wave.

In the following embodiments a multi-channel renderer is used for calculating driving coefficients or for generating or providing drive signals for loudspeakers. For this, a known multi-channel renderer may be adapted according to the aspects of the invention described below. The multi-channel renderer may be, for example, a wave field synthesis renderer or a surround sound renderer. Some of the following examples are explained in terms of a wave field synthesis renderer, but using other multi-channel renderers for other applications may also be possible.

Figure 2:
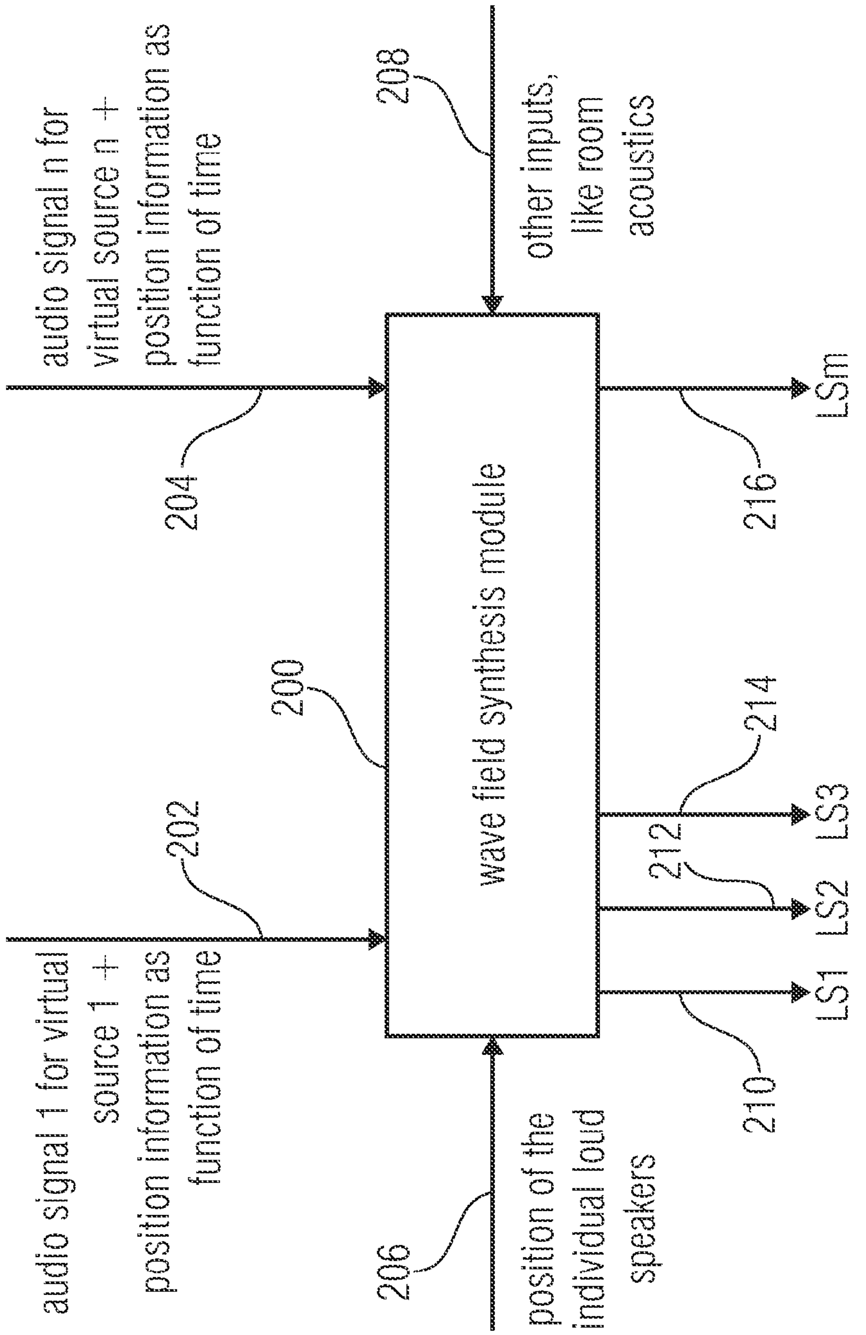
FIG. 2 is a block diagram of a wave field synthesis module.

As an example for a multi-channel renderer a wave field synthesis renderer (also called wave field synthesis module) is shown in FIG. 2. A wave field synthesis module comprising several inputs 202, 204, 206 and 208 as well as several outputs 210, 212, 214 and 216 is the center of a wave field synthesis environment. Different audio signals for virtual sources are supplied to the wave field synthesis module via inputs 202 to 204. Thus, input 202 receives, for example, an audio signal of the virtual source 1 as well as associated position information of the virtual source. In a cinema setting, for example, the audio signal 1 would be, for example, the speech of an actor moving from a left side of the screen to a right side of the screen and possibly additionally away from the audience or towards the audience. Then, the audio signal 1 would be the actual speech of the actor, while the position information as function of time represents the current position of the first actor in the scene at a certain time. In contrary, the audio signal n would be the speech, for example of a further actor which moves in the same way or in a different way than the first actor. The current position of the other actor to which the audio signal n is associated, is provided to the wave field synthesis module by position information synchronized with the audio signal n. In practice, different virtual sources exist, depending on the scene describing their attributes, wherein the audio signal of every virtual source is supplied as individual audio track to the wave field synthesis module 120.

One wave field synthesis module feeds a plurality of loudspeakers LS1, LS2, LS3, LSM of the loudspeaker arrangement by outputting loudspeaker signals via the outputs 210 to 216 to the individual loudspeakers. Via the input 206, the positions of the loudspeakers of the loudspeaker arrangement are provided to the wave field synthesis module 200.

Alternatively, the filter coefficient calculation and the rendering of audio may be done separately. The renderer would get source and loudspeaker positions and would output filter parameters (driving coefficients). After that, the adaptation of the filter coefficients would take place and in a last step, the filter coefficients can be applied to generate the audio. By this, the renderer may be a black box using any algorithm (not only wave field synthesis) to calculate the filters.

In the cinema, many individual loudspeakers are grouped around the audience, which are arranged in arrays advantageously such that loudspeakers are both in front of the audience, which means, for example, behind the screen, and behind the audience as well as on the right hand side and left hand side of the audience. Further, other inputs can be provided to the wave field synthesis module 200, such as information about the room acoustics, etc., in order to be able to simulate actual room acoustics during the recording setting in a cinema.

Generally, the loudspeaker signal, which is, for example, supplied to the loudspeaker LS1 via the output 210, will be a superposition of component signals of the virtual sources, in that the loudspeaker signal comprises for the loudspeaker LS1 a first component coming from the virtual source 1, a second component coming from the virtual source 2 as well as an n-th component coming from the virtual source n. The individual component signals may be linearly superposed, which means added after their calculation to reproduce the linear superposition at the ear of the listener who will hear a linear superposition of the sound sources he can perceive in a real setting.

In the following, an example for a detailed design of the wave field synthesis module 120 will be illustrated with regard to FIG. 3. The wave field synthesis module 120 may have a very parallel structure in that starting from the audio signal for every virtual source and starting from the position information for the corresponding virtual source, first, delay information V; as well as scaling factors SF; (filter coefficients) are calculated for the loudspeakers of the loudspeaker arrangement, which depend on the position information and the position of the just considered loudspeaker. The calculation of delay information V; as well as a scaling factor SF; based on the position information of a virtual source and position of the considered loudspeaker may be performed by known algorithms, which are implemented in means 300, 302, 304, 306.

Based on the delay information $V_i(t)$ and scaling information $SF_i(t)$ of a loudspeaker of the loudspeaker arrangement as well as based on the audio signal $AS_i(t)$ associated with the individual virtual source, a discrete value $AW_i(t_a)$ is calculated for the component signal for a current time $t_a$ in a finally obtained loudspeaker signal. This is performed by means 310, 312, 314, 316 as illustrated schematically in FIG. 3. The individual component signals are then summed by a combiner 320 to determine the discrete value 322 for the current time $t_a$ of the loudspeaker signal for a loudspeaker of the loudspeaker arrangement, which can be supplied to an output for the loudspeaker (for example the output 210, 212, 214 or 216 in FIG. 2).

Figure 3:
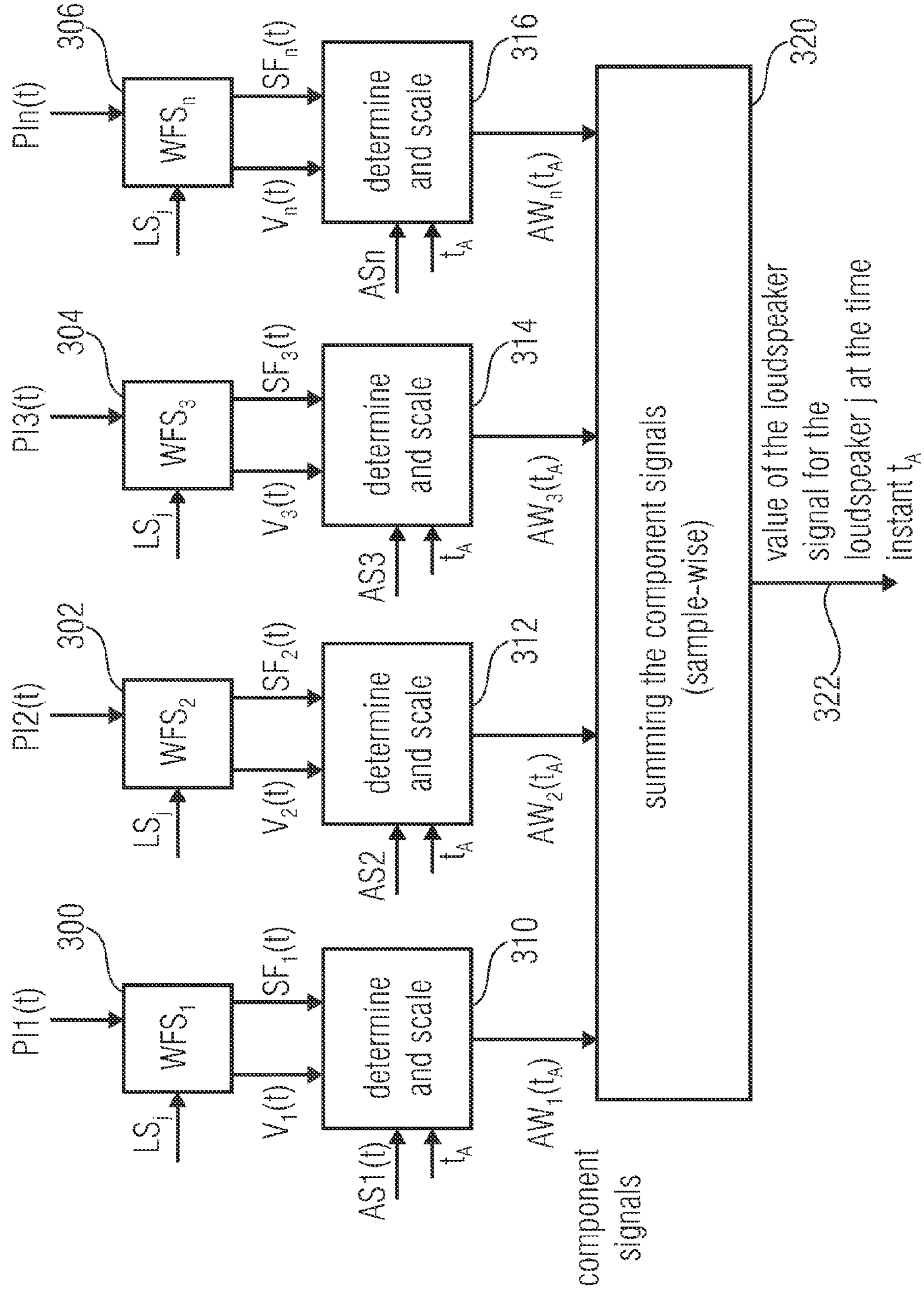
FIG. 3 is a detailed representation of the wave field synthesis module shown in FIG. 2.

As can be seen from FIG. 3, first, a value $AW_i$ of a loudspeaker of the loudspeaker arrangement is calculated individually for every virtual source, which is valid at a current time due to a delay and scaling with a scaling factor, and then all component signals for one loudspeaker are summed due to the different virtual sources. If, for example, only one virtual source is present, the combiner 320 may be omitted and the signal applied at the output of the combiner 320 in FIG. 3 would, for example, correspond to the signal output by means 310 when the virtual source 1 is the only virtual source.

Generally, a loudspeaker arrangement may be represented, for example, by information about the positions of the loudspeakers of the loudspeaker arrangement relatively to each other or absolutely with respect to a point of origin (coordinate origin). This information may be stored by a storage unit and provided to a multi-channel renderer, for example. Therefore, in some embodiments, the here described representation of the loudspeaker arrangement is meant, if a loudspeaker arrangement is mentioned.

According to an aspect of the invention, FIG. 1 shows a block diagram of an apparatus 100 for calculating driving coefficients 112 for loudspeakers of a loudspeaker arrangement for an audio signal associated with a virtual source as an embodiment of the invention. The apparatus 100 comprises a multi-channel renderer 110. This multi-channel renderer 110 calculates first subdriving coefficients for loudspeakers of the loudspeaker arrangement according to a first calculation rule, calculates second subdriving coefficients for the same loudspeakers according to a second calculation rule and calculates driving coefficients 112 for the same loudspeakers based on the first subdriving coefficients and the second subdriving coefficients, if a position 102 of the virtual source is located within an inner area of a loudspeaker transition zone. Further, the multi-channel renderer 110 calculates second subdriving coefficients for loudspeakers of the loudspeaker arrangement according to the second calculation rule, calculates third subdriving coefficients for the same loudspeakers according to a third calculation rule and calculates driving coefficients 112 for the same loudspeakers based on the second subdriving coefficients and the third subdriving coefficients, if a position 102 of the virtual source is located within an outer area of the loudspeaker transition zone. The second calculation rule is different from the first calculation rule and the third calculation rule. Further, the mentioned loudspeaker transition zone separates an inner zone of the loudspeaker arrangement and an outer zone of the loudspeaker arrangement. The loudspeakers of the loudspeaker arrangement are located within the loudspeaker transition zone. For this, for example, a position information 102 (e.g. coordinates) of the virtual source is provided to the multi-channel renderer 110.

Figure 4A:
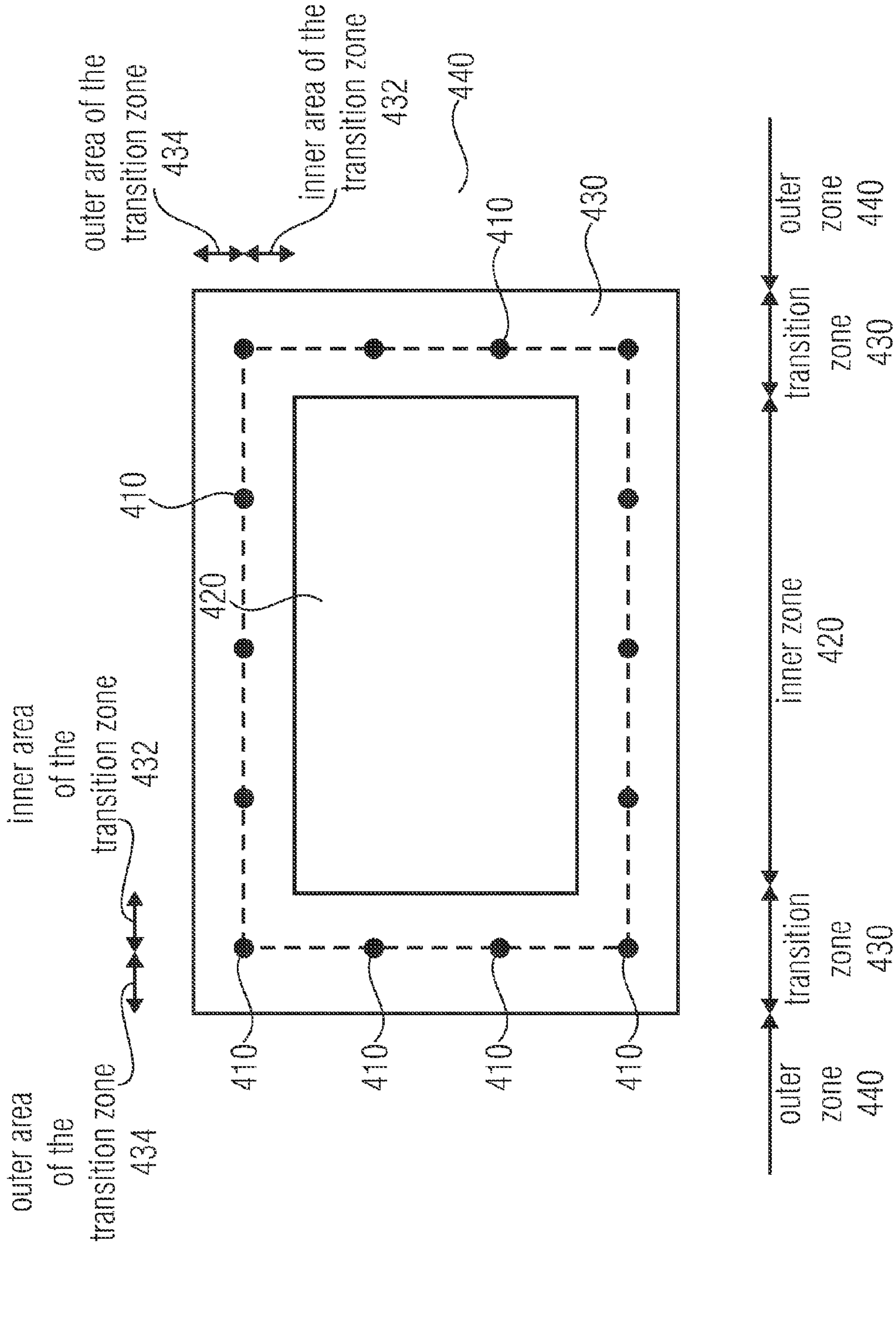
FIG. 4*a* is a schematic illustration of a loudspeaker arrangement.

The multi-channel renderer 110 calculates driving coefficients in dependency on a position of the virtual source in the transition zone. FIG. 4*a* shows a schematic illustration of a loudspeaker arrangement 400 with an indicated loudspeaker transition zone 430. In this example, the loudspeakers 410 of the loudspeaker arrangement are positioned in a rectangle. The rectangle of loudspeakers 410 is surrounded by the loudspeaker transition zone 430. The loudspeaker transition zone 430 separates the inner zone 420 of the loudspeaker arrangement and the outer zone 440 of the loudspeaker arrangement. The part of the loudspeaker transition zone 430 located inside the loudspeaker arrangement is the inner area 432 of the loudspeaker transition zone 430 and the part of the loudspeaker transition zone 430 located outside the loudspeaker arrangement is the outer area 434 of the loudspeaker transition zone 430.

It is known, for example, from methods for realizing the wave field synthesis that for the synthesis of different virtual point sources, different modes for focused and non-focused sources exist. Both modes result from the position of the virtual source relative to the loudspeaker. For both modes, different approaches for coefficient calculation may be applied, as the different modes are to cause different characteristics with regard to wave field and sound perception. Typically, the interior of a imagined envelope curve (border between inner area and outer area of the loudspeaker transition zone) or area which may be formed from the loudspeaker positions within sufficient location of the source for the application of the focused mode. The exterior leads to the application of the non-focused mode. In particular with large distances of the loudspeakers with respect to each other, it is sensible to implement the transition between the two types of coefficient calculation such that with a source movement in the proximity of the envelope (border between inner area and outer area of the loudspeaker transition zone) no interfering erratic changes of the coefficient sets result which may cause artifacts in audio signal processing and changes in source perception), but a steady, continuous performance of coefficient change. For this purpose, a loudspeaker transition zone is introduced. If a source is located in the loudspeaker transition zone, again a special coefficient calculation may be applied (e.g., amplitude panning method). In conventional implementations an abrupt changeover between these three variants of coefficient calculation may be executed depending on the position of the source, i.e., a small change of the source coefficient may cause especially artifact loaded change of the driving coefficients.

According to the described aspect of the invention, the transition zone is initially implemented such that the three variants (three calculation rules) of the coefficient calculation are not abruptly switched over but are continuously merged depending on the position of the source. In this way, artifacts can be significantly reduced and the audio quality can be improved.

The first calculation rule may be a suitable algorithm for calculating driving coefficients for the inner zone 420 of the loudspeaker arrangement, the second calculation rule may be an algorithm suitable for calculating driving coefficients in the loudspeaker transition zone 430 and the third calculation rule may be an algorithm suitable for calculating driving coefficients in the outer zone 440 of the loudspeaker arrangement. Although the first calculation rule and the third calculation rule may be equal, the treatment of virtual sources in the inner zone 420 of the loudspeaker arrangement and in the outer zone 440 of the loudspeaker arrangement based on different calculation rules considering the differences between virtual sources in the inner zone (e.g. focused virtual sources) and in the outer zone (e.g. non-focused virtual sources) more accurate may be advantageous. Therefore, advantageously the first calculation rule may be different from the third calculation rule.

Since the first calculation rule may be suitable for virtual sources located in the inner zone 440 of the loudspeaker arrangement, the multi-channel renderer 110 may provide the first subdriving coefficients as driving coefficients for loudspeakers of the loudspeaker arrangement without considering the second subdriving coefficients and the third subdriving coefficients, if the position of the virtual source is located in the inner zone 420 of the loudspeaker arrangement. Consequently, the multi-channel renderer 110 may provide the third subdriving coefficients as driving coefficients for loudspeakers of the loudspeaker arrangement without considering the first subdriving coefficients and the second subdriving coefficients, if the position of the virtual source is located in the outer zone 440 of the loudspeaker arrangement. In other words, in the inner zone 420 of the loudspeaker arrangement, the driving coefficients for loudspeakers are calculated based on the first calculation rule, and in the outer zone 440 of the loudspeaker arrangement, the driving coefficients for loudspeakers of the loudspeaker arrangement are calculated based on the third calculation rule.

For example, the multi-channel renderer 110 may calculate the driving coefficients 112 for the loudspeakers based on a linear combination of the first subdriving coefficients and the second subdriving coefficients for the inner area 432 of the loudspeaker transition zone 430 and based on a linear combination of the second subdriving coefficients and the third subdriving coefficients for the outer area 434 of the loudspeaker transition zone 430.

Figure 4B:
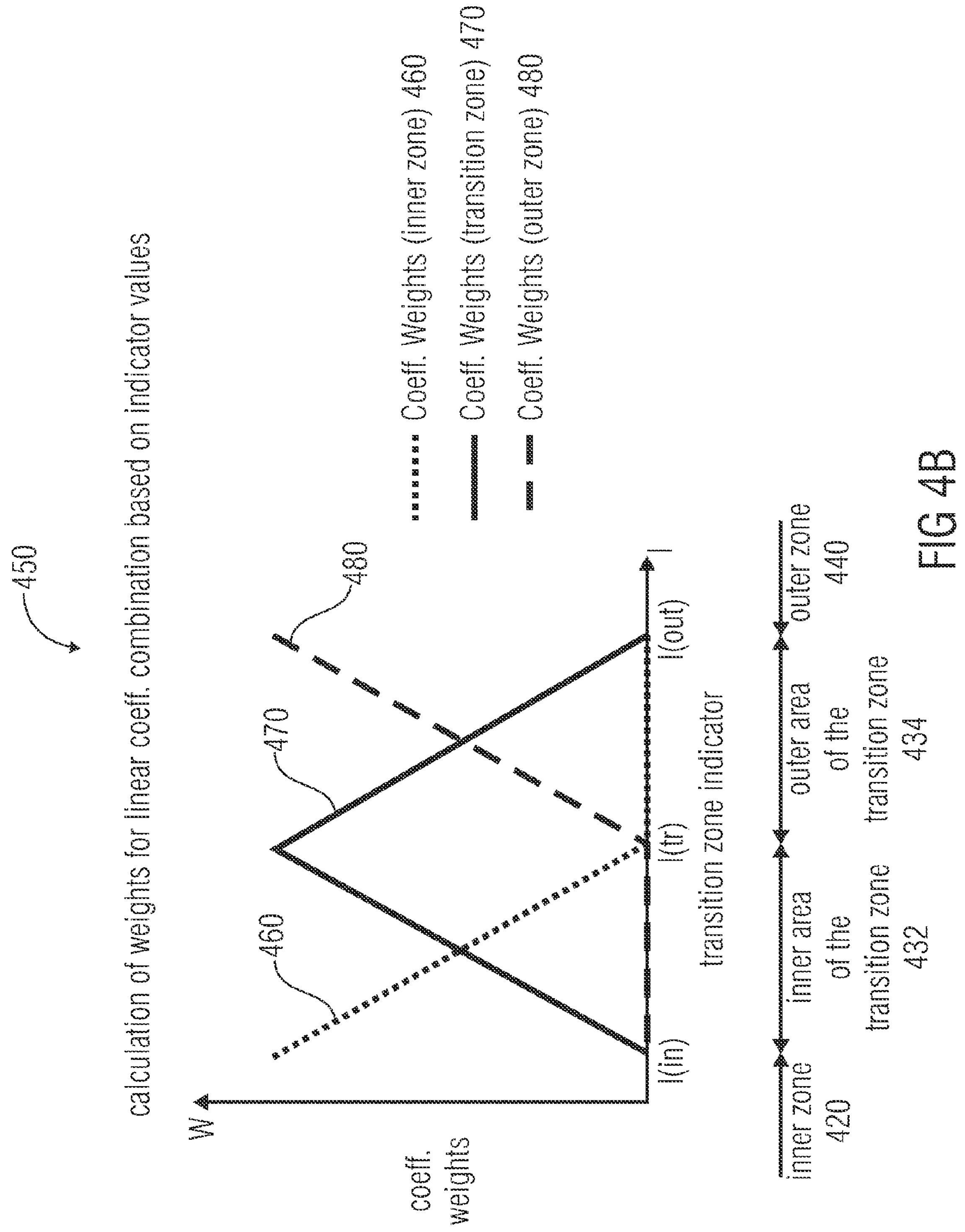
FIG. 4*b* is a diagram indicating coefficient weights for different transition zone indicators and different calculation rules.

An example for the calculation of weights for linear coefficients combination based on indicator values is shown in FIG. 4*b*. It shows a diagram 450 indicating coefficient weights W for different transition zone indicator values I. It shows coefficient weights 460 for the first subdriving coefficients (e.g. inner zone and inner area of the loudspeaker transition zone), coefficient weights 470 for the second subdriving coefficients (e.g. loudspeaker transition zone) and coefficient weights 480 for the third subdriving coefficients (e.g. outer zone and outer zone of the loudspeaker transition zone). The transition zone indicator value indicates where the virtual source is located within the loudspeaker transition zone. In this example, the coefficient weights 460 for the first subdriving coefficients decrease from the inner border of the loudspeaker transition zone to the border of the inner area 432 and the outer area 434 of the loudspeaker transition zone. The coefficient weights 470 for the second subdriving coefficients increase from the inner border of the loudspeaker transition zone to the border of the inner area 432 and the outer area 434 of the loudspeaker transition zone and decreases from the border of the inner area 432 and the outer area 434 of the loudspeaker transition zone to the outer border of the loudspeaker transition zone. Further, the coefficient weights 48 for the third subdriving coefficients increase from the border between the inner area 432 and the outer area 434 of the loudspeaker transition zone to the outer border of the loudspeaker transition zone. Therefore, in this example, the resulting driving coefficients for a virtual source located in the inner area 432 of the loudspeaker transition zone may comprise only portions of the first subdriving coefficients and the second subdriving coefficients and the driving coefficients for a virtual source located in the outer area 434 of the loudspeaker transition zone may comprise only portions of the second subdriving coefficients and the third subdriving coefficients.

Alternatively, the first subdriving coefficients may also be weakly considered in the outer area 434 of the loudspeaker transition zone and/or the third subdriving coefficients may be weakly considered also in the inner area 432 of the loudspeaker transition zone. In this example, the multi-channel renderer 110 may calculate the driving coefficients 112 for the loudspeakers based on the first subdriving coefficients, the second subdriving coefficients and the third subdriving coefficients with a weighting factor for the first subdriving coefficients larger than a weighting factor for the third subdriving coefficients, if a position of the virtual source is located within the inner area 432 of the loudspeaker transition zone, and with a weighting factor for the third subdriving coefficients larger than a weighting factor for the first subdriving coefficients, if a position of the virtual source is located within the outer area 434 of the loudspeaker transition zone.

The width of the loudspeaker transition zone 430 may mainly depend on the loudspeaker arrangement. For example, a border of the loudspeaker transition zone 430 may comprise a minimal distance to a loudspeaker of the loudspeaker arrangement larger than 20% (or 10%, 50% or more) of a distance between the loudspeaker and an adjacent loudspeaker of the loudspeaker arrangement (e.g. the nearest adjacent loudspeaker of the loudspeaker arrangement or a mean distance to loudspeakers nearest in different directions) and lower than two times (or five times, 1.8 times, 1.5 times or lower) the distance between the loudspeaker and the adjacent loudspeaker of the loudspeaker arrangement or a mean of distances between adjacent loudspeakers. The minimal distance may be equal for all loudspeakers of the loudspeaker arrangement, as for example shown in FIG. 4*a*. Alternatively, the minimal distance and in this way the width of the loudspeaker transition zone 430 may vary depending on the distance between the loudspeakers of the loudspeaker arrangement. Further alternatively, the minimal distance may be independent from the distance between loudspeakers as it will be described later on. For example, the border of the loudspeaker transition zone 430 may comprise a minimal distance to a loudspeaker of the loudspeaker arrangement larger than 0.2 m (or 0.1, 0.5 or 1 m) and lower than 2 m (or 5 m, 1.5 m or lower).

The gradual transition between the coefficient sets may be realized as a linear combination (weighted sum) of the three pre-calculated coefficient sets. In this example, the weighting is determined by a weighting function which, depending on the position of the source relative to the envelope curve/area of the system, returns three weighting factors by which the coefficient sets are multiplied. The weighting function may be varied regarding the form of the force of the function.

The position of the source in FIG. 4*b* may typically be indicated as a scalar indicator value describing the relative position of the source of the envelope for example as real number between −1 (source on the inner border of the transition zone) and 1 (source on the outer border of the transition zone). The indicator value 0 then means that the source is located on the envelope area (on the border between the inner area and the outer area of the loudspeaker arrangement). The determination of this indicator value may be determined with the help of a distance of the intersection of the source direction and the envelope from the view of a reference point (predefined listener position) from this reference point. This distance and a predetermined direction dependent target width of the transition zone at this location allow a comparison to the actual distance of the source from the reference point and thus the allocation of an indicator value as described above.

In other words, for example, the multi-channel renderer 110 may determine an indicator value based on a ratio of a minimal distance between the position of the virtual source located within the loudspeaker transition zone and a border between the inner area of the loudspeaker transition zone and the outer area 434 of the loudspeaker transition zone and a distance between a border of the loudspeaker transition zone 430 and the border of the inner area 432 of the loudspeaker transition zone and the outer area 434 of the loudspeaker transition zone. Further, the multi-channel renderer 110 may calculate the driving coefficients by weighting the first subdriving coefficients and the second subdriving coefficients based on the indicator value or by weighting the second subdriving coefficient and the third subdriving coefficients based on the indicator value.

What is important in this figure is the determination of an indicator value for each source position. If a virtual source is located in the transition zone, an indicator value may be allocated to its position, depending on how closely it is positioned to the inner or outer of the transition zone. Favorably, this is possible using a number taking on values in the interval [I(in), I(out)]. The interval boundaries correspond to the borders of the (loudspeaker transition) zone. I(tr) represents an indicator value referring to center of the transition zone (border between the inner area and the outer area of the loudspeaker transition zone).

A large variety of calculation rules for calculating driving coefficients for loudspeakers of a loudspeaker arrangement are known. Some examples for the determination of coefficient sets (subdriving coefficients) for the different areas related to, for example, the application for wave field synthesis are described below.

For example, for determining a coefficient set for the implementation of a wave field synthesis in the outer zone of a loudspeaker arrangement the calculation rule described in "Verheijen, E. "Sound Reproduction by Wave Field Synthesis", PhD, TU Delft 1998, pp. 105f./Eq 4.4b, 4.7 a/b/c" may be used.

In this example loudspeaker array driving signals can be obtained based on a vector operator Y with elements $$Y_n(t) = \sqrt{\frac{\zeta}{\zeta-1}}\frac{\cos\varphi_n}{\sqrt{r_n}}\delta(t+\mathrm{sign}(\zeta)r_n/c) \qquad (4.4b)$$

$\zeta$ refers to geometric constructions of the WFS operators, it denotes the ratio between the signed z-coordinates of the reference line and the primary source, for a line of secondary monopole sources (loudspeakers) situated at z=0. $\phi$ denotes the angle of incidence from the primary source at the secondary source line, it refers to geometric constructions of the WFS operators. n is the index of the secondary source (loudspeaker).

$r_n$ is the distance from the rendered virtual source to the secondary source (loudspeaker) n.

The task of the operator Y is to apply the correct delay and weighting coefficients from M filtered input signals to N output signal. If the input signals are written as a source vector $$s(t)=[s_1(t) \ldots s_m(t) \ldots s_M(t)]^T, \qquad (4.5)$$

then the vector operator Y can be extended to a matrix operator Y yielding array driving signals $$q(t)=Y(t)*[h_{IIR}(t)*s(t)], \qquad (4.6)$$

where * denotes time-domain convolution, and the elements of Y are given by $$Y_{nm}(t)=a_{nm}\delta(t-\tau_{nm}), \quad (4.7a)$$

with weighting coefficients (driving coefficients)

$$a_{nm}=\sqrt{\frac{\zeta_m}{\zeta_m-1}}\frac{\cos\varphi_{nm}}{\sqrt{r_{nm}}}, \quad (4.7b)$$

and time delays (driving coefficients)

$$\tau_{nm}=\tau_0-\text{sign}(\zeta_m)\frac{r_{nm}}{c}. \quad (4.7c)$$

τ denotes the resulting time delay of the primary source signal of index m reproduced on secondary source (loudspeaker) n.

Note that an extra delay $\tau_0>0$ has been introduced to avoid non-causality in case sign $(\zeta_m)=+1$ (for sources in front of the array). The delay values are derived from the distance between loudspeaker and virtual source. The weighting coefficients $a_{nm}$ depend on the position of the reference line R via the ratio $\zeta=z_R/z_S$. For a straight linear array, the reference line at $z=z_R$ is usually chosen parallel to the array in the middle of the listening area. For a linear array with corners, e.g. a rectangular array, a single parallel reference line is impossible. A solution is found in applying a driving function, which permits non-parallel reference lines to be used. By writing $\Delta r/r=\zeta$, the same form is obtained as in (2.30).

In this way, non-focusing operator and focusing operator can be combined:

$$Q_m^{gen}(x,\omega)=S(\omega)\sqrt{\frac{\text{sign}(\zeta)k}{2\pi j}}\sqrt{\frac{\zeta}{\zeta-1}}\cos\varphi\frac{\exp(\text{sign}(\zeta)jkr)}{\sqrt{r}}, \quad (2.30)$$

where $\zeta=z_R/z_S$, the ratio between the respective (signed z-coordinates of the reference line and the primary source (for example, $z_R=+\Delta z_0$ and $z_S=+z_0$ or $z_R=+\Delta z_0$ and $z_S=-z_0$), for a line of a secondary monopole sources situated at z=0. Note that ζ is positive for the focusing operator and negative for the non-focusing operator. Also, ζ is bounded, i.e. $0\le\zeta\le1$ is inhibited, because for the focusing operator the primary source lies between the secondary sources and the receiver line.

For an inner zone, the determination of efficient sets for the implementation of a wave field synthesis of virtual sources can be realized as also mentioned in "Verheijen, E.: "Sound Reproduction by Wave Field Synthesis", PhD, TU Delft, 1998, pp. 105f. Equation 4.4B, 4.7A/B/C considering the focusing operator page 48, equation 2.31".

The driving coefficients (weighting coefficients and time delay) can be calculated, so that this driving function or focusing operator is realized.

Similarly, a driving function for a secondary dipole source line can be found, with G(ϕ)−1, that holds for a primary monopole source on the same or other side of the secondary source line at z=0;

$$Q_d^{gen}(x,\omega)=\frac{S(\omega)}{j}\sqrt{\frac{\text{sign}(\zeta)}{2\pi jk}}\sqrt{\frac{\zeta}{\zeta-1}}\frac{\exp(\text{sign}(\zeta)jkr)}{\sqrt{r}} \quad (2.31)$$

with the same considerations for $\zeta=z_R/z_S$ as for the secondary monopole sources.

The second calculation rule for the loudspeaker transition zone may be based on, for example, the vector base amplitude panning described in "Pulkki, V.: "Virtual Sound Source Positioning Using Vector Base Amplitude Panning", Journal of the Audio Engineering Society, 45 (6) pp. 456-466, 1997".

In the two-dimensional VBAP method, the two-channel stereophonic loudspeaker configuration is reformulated as a two-dimensional vector base. The base is defined by unit-length vectors $l_1=[l_{11} l_{12}]^T$ and $l_2=[l_{21}\ l_{22}]^T$, which are pointing toward loudspeakers 1 and 2, respectively. The superscript T denotes the matrix transposition. The unit-length vector $p=[p_1\ p_2]^T$, which points toward the virtual source, can be treated as a linear combination of loudspeaker vectors, $$p=g_1l_1+g_2l_2. \quad (7)$$

In Eq. (7) $g_1$ and $g_2$ are gain factors, which can be treated as non-negative scalar variables. The equation can be written in matrix form, $$p^T=gL_{12} \quad (8)$$

where $g=[g_1g_2]$ and $L_{12}=[l_1l_2]^T$. This equation can be solved if $$L_{12}^{-1}$$

exists, $$g=p^TL_{12}^{-1}=[\,p_1\quad p_2\,]\begin{bmatrix} l_{11} & l_{12} \\ l_{21} & l_{22}\end{bmatrix}^{-1}. \quad (9)$$

The inverse matrix $L_{12}^{-1}$ satisfies $L_{12}L_{12}^{-1}=I$, where I is the identity matrix. $L_{12}^{-1}$ exists when $\phi_0\neq0°$ and $\phi_0\neq90°$, both problem cases corresponding to quite uninteresting stereophonic loudspeaker placements. For such cases the one-dimensional VBAP can be formulated, which is not discussed here because of its triviality.

When $\phi_0\neq45°$, the gain factors may be normalized using the equation $$g^{scaled}=\frac{\sqrt{C}\,g}{\sqrt{g_1^2+g_2^2}}. \quad (10)$$

The sound power can be set to a constant value C, whereby the following approximation can be stated:

$$g_1^2+g_2^2=C \quad (11)$$

Now gain factors $g^{scaled}$ satisfy Eq. (11).

These gain factors (driving coefficients) can easily be generalized for more than two loudspeakers and also for the 3-dimensional case as also shown in "Pulkki, V.: "Virtual Sound Source Positioning Using Vector Base Amplitude Panning", Journal of the Audio Engineering Society, 45 (6) pp. 456-466, 1997".

An alternative to the proposed approach may be the abrupt switching between coefficient sets which may, however, result in interfering artifacts.

Although only one virtual source is mentioned during the description of the embodiment shown in FIG. 1, it is obvious that the proposed concept can be applied to a plurality of stationary or moving virtual sources. For this, the apparatus for calculating driving coefficients for loudspeakers of the loudspeaker arrangement may comprise a combiner, as already shown by the means for summing the component signals 320 shown in FIG. 3. In this case, the multi-channel renderer 110 may calculate driving coefficients for loudspeakers of the loudspeaker arrangement for a second virtual source (or more virtual sources) and generates an adapted audio signal for the (first already mentioned) virtual source and an adapted audio signal for the second virtual source based on the calculated driving coefficients of the respective virtual source and the audio signal associated with the respective virtual source. This means, for example, a scaling and a delaying of the audio signal associated to the virtual source to obtain an adapted audio signal. Then, the combiner combines the adapted audio signal of the (first) virtual source and the adapted audio signal of the second virtual source to obtain an output audio signal for a loudspeaker of the loudspeaker arrangement. In other words, the multi-channel renderer may adapt the audio signal of a virtual source by the calculated driving coefficients (e.g. amplify and delay) and the combiner combines the adapted audio signal of all virtual sources relevant for a loudspeaker to obtain the output audio signal for the loudspeaker. This output audio signal may then be provided to the loudspeaker of the loudspeaker arrangement.

For example, if the described aspect of the invention is implemented in a described basic wave field synthesis module shown in FIGS. 2 and 3, the calculation of the different subdriving coefficients may be implemented in the wave field synthesis means 300, 302, 304, 306.

The multi-channel renderer 110 and/or the combiner may be independent hardware units, part of a computer, microcontroller or digital signal processor as well as a computer program or a software product for running on a computer, microcontroller or digital signal processor.

Figure 10:
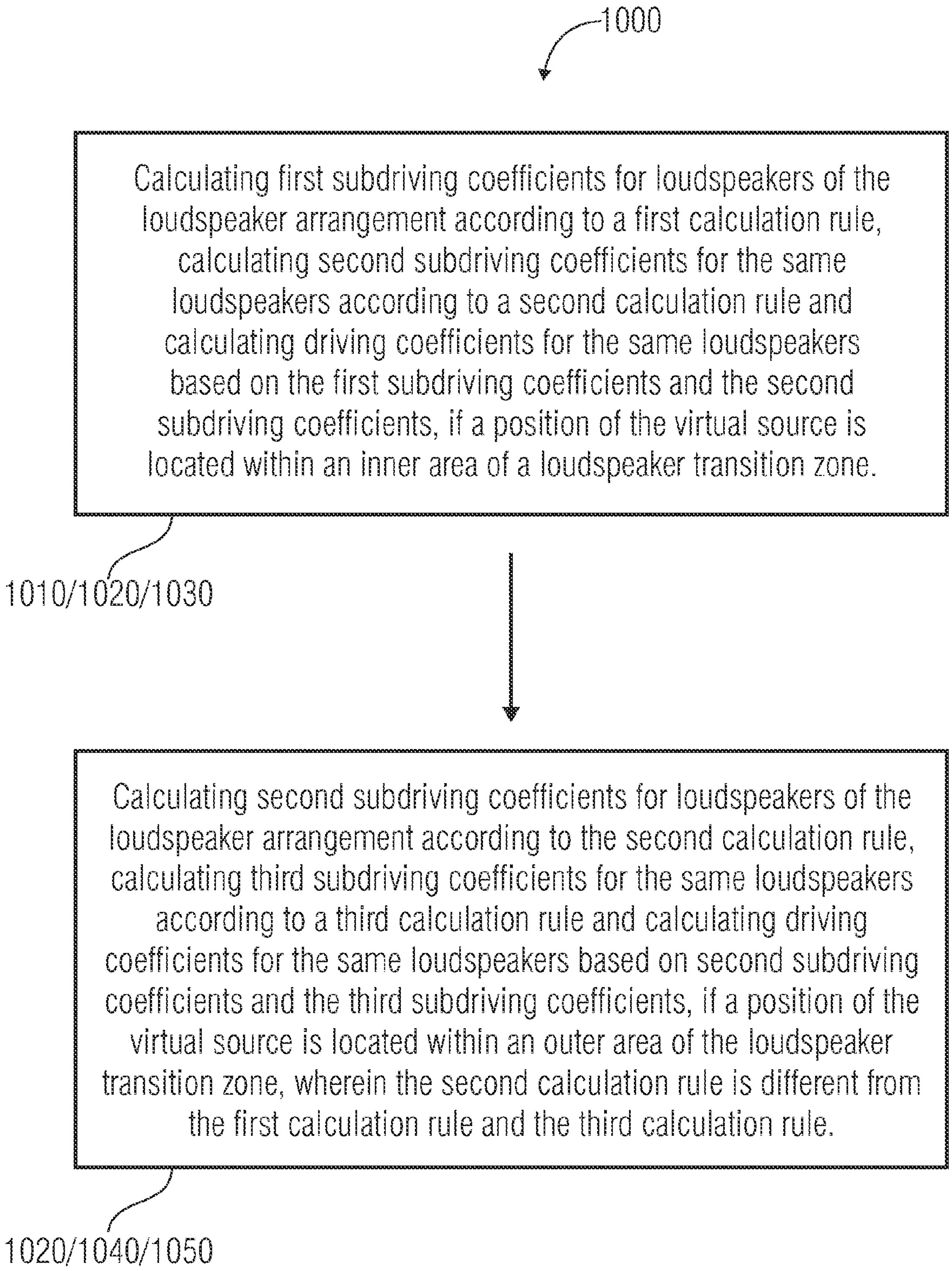
FIGS. 10,11 is a flowchart of a method for calculating driving coefficients for loudspeakers of a loudspeaker arrangement.

FIG. 10 shows a flowchart of a method 1000 for calculating driving coefficients for loudspeakers of as loudspeaker arrangement according to an embodiment of an aspect of the invention. The method 1000 comprises calculating 1010 first subdriving coefficients for loudspeakers of the loudspeaker arrangement according to a first calculation rule, calculating 1020 second subdriving coefficients for the same loudspeakers according to a second calculation rule and calculating 1030 driving coefficients for the same loudspeakers based on the first subdriving coefficients and the second subdriving coefficients, if a position of the virtual source is located within an inner area of a loudspeaker transition zone. Further, the method 1000 comprises calculating 1020 second subdriving coefficients for loudspeakers of the loudspeaker arrangement according to the second calculation rule, calculating 1030 third subdriving coefficients for the same loudspeakers according to third calculation rule and calculation 1040 driving coefficients for the same loudspeakers based on the second subdriving coefficients and the third subdriving coefficients, if a position of the virtual source is located within an outer area of the loudspeaker transition zone. The second calculation rule is different from the first calculation rule and the third calculation rule. Further, the loudspeaker transition zone separates an inner zone of the loudspeaker arrangement and an outer zone of the loudspeaker arrangement. The loudspeakers of the loudspeaker arrangement are located within the loudspeaker transition zone.

Additionally, the method 1000 may comprise one or more further steps corresponding to the optional features of the described concept mentioned above.

Figure 5A:
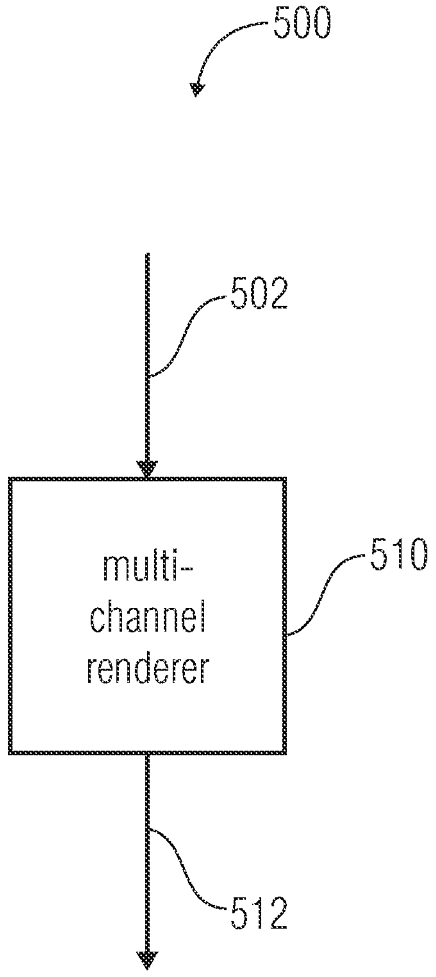
FIG. 5*a* is a block diagram of an apparatus for calculating driving coefficients for loudspeakers of a loudspeaker arrangement.

FIG. 5*a* shows a block diagram of an apparatus 500 for calculating driving coefficients 512 for loudspeakers of a loudspeaker arrangement for an audio signal associated with a virtual source as an embodiment according to another aspect of the invention. The apparatus 500 comprises a multi-channel renderer 510. The multi-channel renderer 510 calculates driving coefficients 512 for loudspeakers of a loudspeaker arrangement based on a first calculation rule, if a position of the virtual source is located outside a loudspeaker transition zone. Further, the multi-channel renderer 510 calculates driving coefficients 512 for loudspeakers of the loudspeaker arrangement based on a second calculation rule, if the position 502 of the virtual source is located within the loudspeaker transition zone. In this embodiment, the border of the loudspeaker transition zone comprises a minimal distance to a loudspeaker of the loudspeaker arrangement depending on a distance between the loudspeaker and a loudspeaker adjacent to this loudspeaker. Further, the loudspeaker arrangement comprises at least two pairs of adjacent loudspeakers with different distances between the loudspeakers of the respective pair of loudspeakers. For this, for example, a position information 502 (e.g. coordinates) of the virtual source is provided to the multi-channel renderer 510.

The described concept considers a varying distance between adjacent loudspeakers of the loudspeaker arrangement by varying the width of the loudspeaker transition zone surrounding the loudspeakers. For example, if a distance between adjacent loudspeakers gets larger, the minimal distance of the border of the loudspeaker transitions to the adjacent loudspeakers also increases. In this way, artifacts caused by varying distances between loudspeakers of the loudspeaker arrangement may be significantly reduced and the audio quality may be improved. Conventional implementation only comprise a transition zone surrounding the envelope with a constant width.

The loudspeaker transition zone separates an inner zone of the loudspeaker arrangement and an outer zone of the loudspeaker arrangement and all loudspeakers of the loudspeaker arrangement are located within the loudspeaker transition zone. Therefore, the loudspeaker transition zone comprises an inner border to the inner zone of the loudspeaker arrangement and an outer border to the outer zone of the loudspeaker arrangement. The minimal distance indicates the closest distance of the inner border or the outer border of the loudspeaker transition zone to a loudspeaker. In other words, the minimal distance of the border of the loudspeaker transition zone to a loudspeaker may be measured from the inner border of the loudspeaker transition zone to the loudspeaker or from the outer border of the loudspeaker transition zone to the loudspeaker. Alternatively, the inner border of the loudspeaker transition zone as well as the outer border of the loudspeaker transition zone comprise the same minimal distances to the loudspeaker. Since the minimal distance of the border of the loudspeaker transition zone to a loudspeaker varies depending on a distance between the loudspeaker and an adjacent loudspeaker of this loudspeaker, the loudspeaker transition zone comprises a variable width.

The border of the loudspeaker transition zone may comprise different minimal distances to at least two loudspeakers of the loudspeaker arrangement.

In general, the minimal distance of the border of the loudspeaker transition zone to a loudspeaker may increase with the increasing distance of the loudspeaker to a loudspeaker adjacent to the loudspeaker. For example, the minimal distance may increase linearly with increasing distance of adjacent loudspeakers.

The minimal distance of the border of the loudspeaker transition zone to a loudspeaker of the loudspeaker arrangement may be equal to a multiplication factor multiplied with a distance between the loudspeaker and a closest adjacent loudspeaker or with a mean of a distance between the loudspeaker and at least two adjacent loudspeakers positioned in different directions from the loudspeaker. For example, in the 2-dimensional case usually each loudspeaker comprises two adjacent loudspeakers, one to the right and one to the left. In the 3-dimensional case, there may be three or more loudspeakers (e.g. left, right, up, down) adjacent to a loudspeaker of the loudspeaker arrangement. The multiplication factor can be chosen in a wide range. For example, the multiplication factor may be between 0.1 and 5 (e.g. 0.1, 0.2, 0.5, 1, 2 or 5).

So, the border of the loudspeaker transition zone may comprise a minimal distance to a loudspeaker of the loudspeaker arrangement larger than 10% of a distance between the loudspeaker and an adjacent loudspeaker of the loudspeaker arrangement (or a mean of distances between the loudspeaker and more than one adjacent loudspeakers positioned in different directions) and lower than five times the distance between the loudspeaker and the adjacent loudspeaker of the loudspeaker arrangement. The border of the loudspeaker transition zone may comprise an individual minimal distance to 1, 2, some or each loudspeaker of the loudspeaker arrangement depending on the distance between a respective loudspeaker and a loudspeaker adjacent to the respective loudspeaker.

Figure 5B:
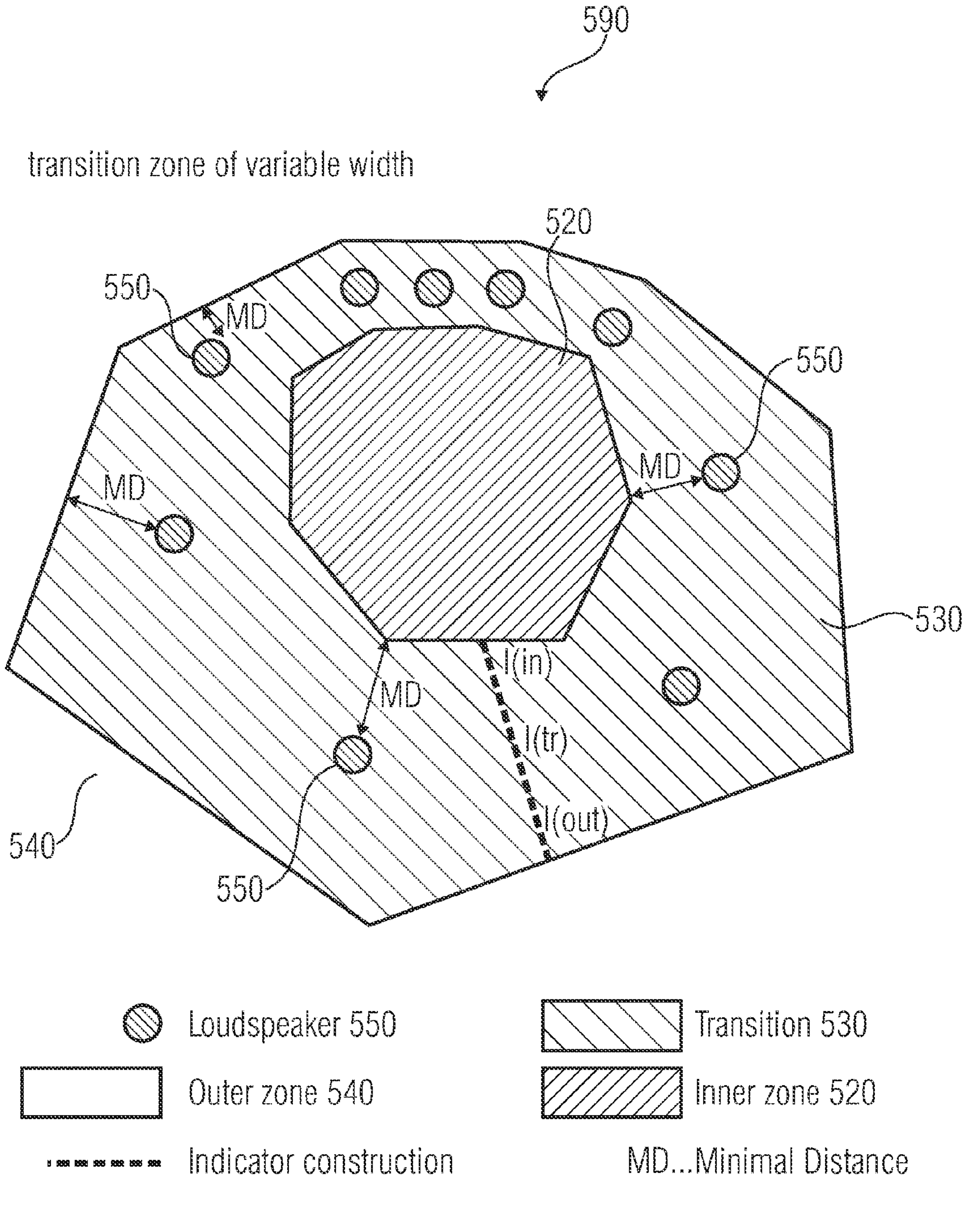
FIG. 5*b* is a schematic illustration of a loudspeaker arrangement with a loudspeaker transition zone of variable width.

An example 590 for a loudspeaker transition zone 530 with variable width is shown in FIG. 5*b*. The schematic illustration shows a plurality of loudspeakers 550 surrounded by a transition zone 550 with a variable width (or a variable minimal distance) depending on the varying distances between adjacent loudspeakers 550. As already mentioned, the transition zone 530 separates an inner zone 520 of the loudspeaker arrangement and an outer zone 540 of the loudspeaker arrangement.

In other words, a realization of a transition zone, which extension depends on the loudspeaker setup, is shown. Typically, this happens by the width of the transition zone being dependent on the distance between the loudspeakers. Apart from that, the width of the transition zone may change within a loudspeaker system if the loudspeaker density within the system varies. For example, densely arranged loudspeaker areas are surrounded by a narrow transition zone, while areas of a great loudspeaker distance has a wide transition zone. In other words, the loudspeaker transition zone may comprise a minimal distance to a loudspeaker of the loudspeaker arrangement depending on a loudspeaker density value indicating a density of loudspeaker within an area of predefined size around this loudspeaker. The loudspeaker density value may be measured in loudspeaker/m, for example. For the calculation a typical listener position (in the following referred to as reference point) or predefined listener position may be assumed.

To determine the width of the transition zone for all directions of source position, the following method, for example, is proposed. For each loudspeaker before the actual coefficient calculation a configuration value is determined which may be processed as the width of the loudspeaker transition zone. This value is calculated from the distances of this loudspeaker to those loudspeakers which surround the same as nearest neighbors from the view of the reference point. In the 2D case, these are two other loudspeakers, in the 3D case these are three (or more) other loudspeakers. In order to determine the configuration width value, for example the mean distance to the other loudspeakers may be assumed. Likewise, other measures (e.g., maximum distance, minimum distance) would be possible. This configuration value of the width of the transition zone in the direction of the associated loudspeaker may further still be changed before the application (e.g., by multiplication with a factor), to adapt the coefficient determination to the requirements of the system.

With the help of the configuration value for the width of the transition zone which then exists for all loudspeakers, for each position of the source a value for the width of the transition zone may be determined as follows. First of all, from the view of the reference point (predefined listener position), the neighboring, surrounding loudspeakers regarding the direction of the source positions are found. Then, a set of factors is calculated, which provides the normalized vector of the source position from the normalized vectors of the determined loud speakers with the help of a linear combination (the vectors each starting from the reference point). With the help of these factors, the desired width of the transition zone in the direction of the sound source may be determined by using the factors in the weighting of a sum of the width configuration values. This adding may be executed in different forms.

Further, an indicator value construction is indicated in FIG. 5*b*. The calculation and application of an indicator value for determining weighting factors may be done similarly as described in connection with FIG. 4*b*.

FIG. 5*b* schematically shows how the width of the transition zone is made locally dependent on the loudspeaker distance. In this example, the existence of this dependence has priority regarding to equality, not the exact calculation.

The minimal distance of the border of the loudspeaker transition zone may be determined for the loudspeaker of the loudspeaker arrangement by the described apparatus or the apparatus may decide whether to use the first calculation rule or the second calculation rule based on an information contained by a look-up table. For example, the multi-channel renderer 510 may comprise a storage unit with a lookup table containing information whether a position 502 of a virtual source is located inside or outside the loudspeaker transition zone, so that the multi-channel renderer 510 uses the first calculation rule or the second calculation rule depending on the information contained by the lookup table for the position 502 of the virtual source. In other words, the lookup table may contain for discrete possible positions of a virtual source an information whether the position is inside or outside the loudspeaker transition zone. So, the multi-channel renderer may only need to determine the information contained by the lookup table associated with a discrete position, for example, closest to the position 502 of the virtual source or may interpolate (e.g. linearly) information associated with two discrete positions closest to the position 502 of the virtual source.

Figure 6:
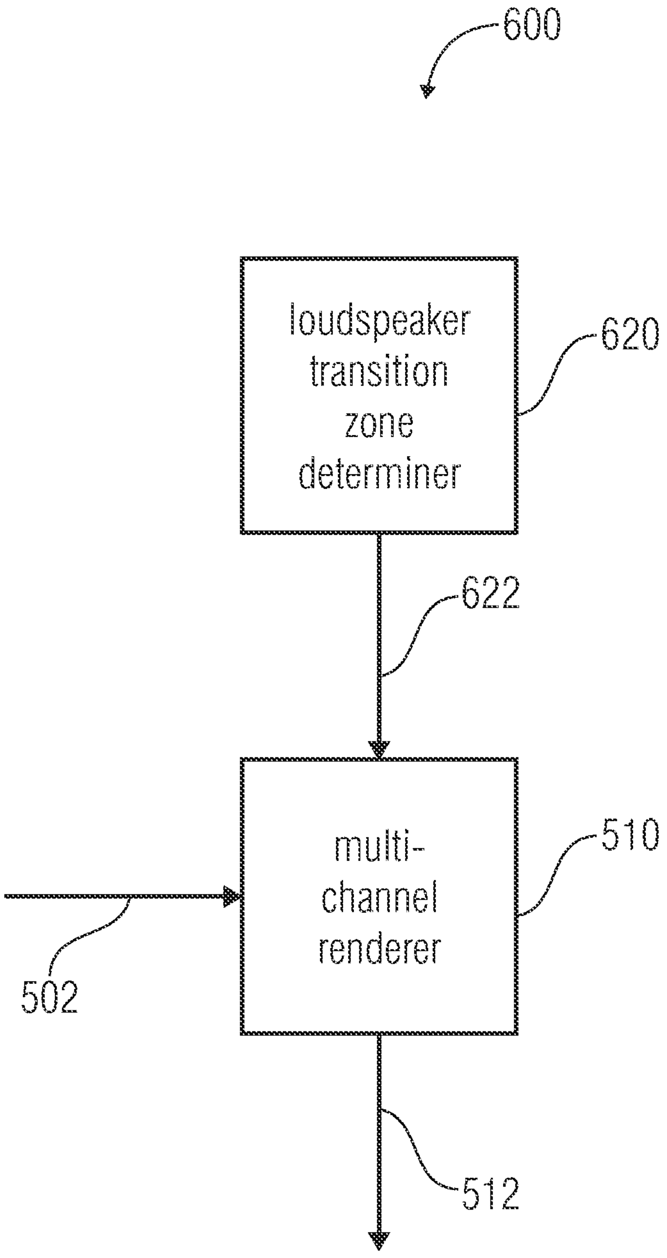
FIG. 6 is a block diagram of an apparatus for calculating driving coefficients for loudspeakers of a loudspeaker arrangement.

Alternatively, an apparatus 600 for calculating driving coefficients for loudspeakers of a loudspeaker arrangement for an audio signal associated with a virtual source may comprise a loudspeaker transition zone determiner 620, as shown in FIG. 6. The loudspeaker transition zone determiner 620 is connected to the multi-channel renderer 110 and is configured to determine the minimal distance 622 of the border of the loudspeaker transition zone for a loudspeaker of the loudspeaker arrangement based on the distance between the loudspeaker and a loudspeaker adjacent to this loudspeaker. This may be done by calculating the minimal distance or by obtaining the minimal distance from a lookup table containing minimal distances for a plurality of different possible discrete distances between adjacent loudspeakers of the loudspeaker arrangement.

The multi-channel renderer 510 and/or the loudspeaker transition zone determiner 620 may be independent hardware units, part of a computer, microcontroller or digital signal processor as well as a computer program or software product for running on a computer, microcontroller or digital signal processor.

As already mentioned before, also this aspect of the present invention was explained with regard to one virtual source, although a plurality of audio objects or virtual sources can be handled by the described concept. For example, the multi-channel renderer 510 may calculate driving coefficients for loudspeakers of the loudspeaker arrangement for a second (or a plurality of) virtual source. Further, the multi-channel renderer 510 may generate an adapted audio signal for the (first, already mentioned) virtual source and an adapted audio signal for the second virtual source based on the calculated driving coefficients of the respective virtual source and the audio signal associated with the respective source. Then a combiner (e.g. the means 320 for summing the component signals shown in FIG. 3, as already mentioned before) may combine the adapted audio signal of the (first) virtual source and the adapted audio signal of the second virtual source to obtain an output audio signal for a loudspeaker of the loudspeaker arrangement. In this way, portions of audio signals from different virtual sources can be reproduced at the same time by a loudspeaker of the loudspeaker arrangement.

The first calculation rule may be a suitable algorithm for determining driving coefficients for an inner zone and/or an outer zone of the loudspeaker arrangement. For example, the first calculation rule may be similar or equal to the first calculation rule or the third calculation rule mentioned in connection with the aspect of the invention shown in FIGS. 1, 4*a* and 4*b*. Further, the second calculation rule may be a suitable algorithm for calculating driving coefficients in the transition zone. For example, the second calculation rule may be similar or equal to the second calculation rule mentioned in connection with the aspect of the invention described in FIGS. 1, 4*a* and 4*b*.

Figure 11:
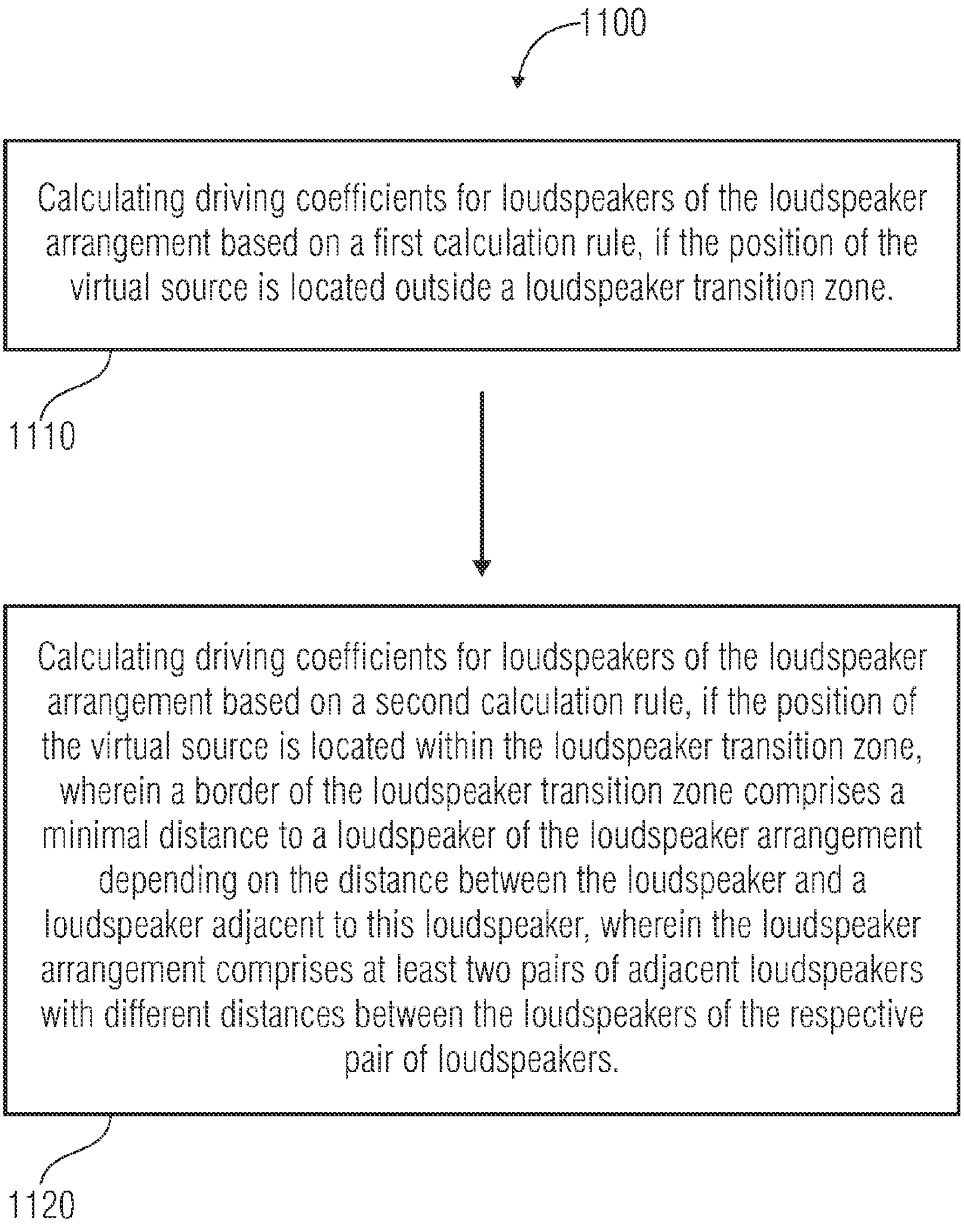

FIG. 11 shows a flowchart of a method 1100 for calculating driving coefficients for loudspeakers of a loudspeaker arrangement for an audio signal associated with a virtual source according to an embodiment of the invention. The method 1100 comprises calculating 1110 driving coefficients for loudspeakers of the loudspeaker arrangement based on a first calculation rule, if a position of the virtual source is located outside the loudspeaker transition zone and calculating 1120 driving coefficients for loudspeakers of the loudspeaker arrangement based on a second calculation rule, if the position of the virtual source is located within the loudspeaker transition zone. A border of the loudspeaker transition zone comprises a minimal distance to a loudspeaker of the loudspeaker arrangement depending on a distance between the loudspeaker and a loudspeaker adjacent to this loudspeaker. Further, the loudspeaker arrangement comprises at least two pairs of adjacent loudspeakers with different distances between the loudspeakers of the respective pair of loudspeakers.

Additionally, the method 1100 may comprise one or more further steps representing one or more optional features of the concept described above.

Figure 8:
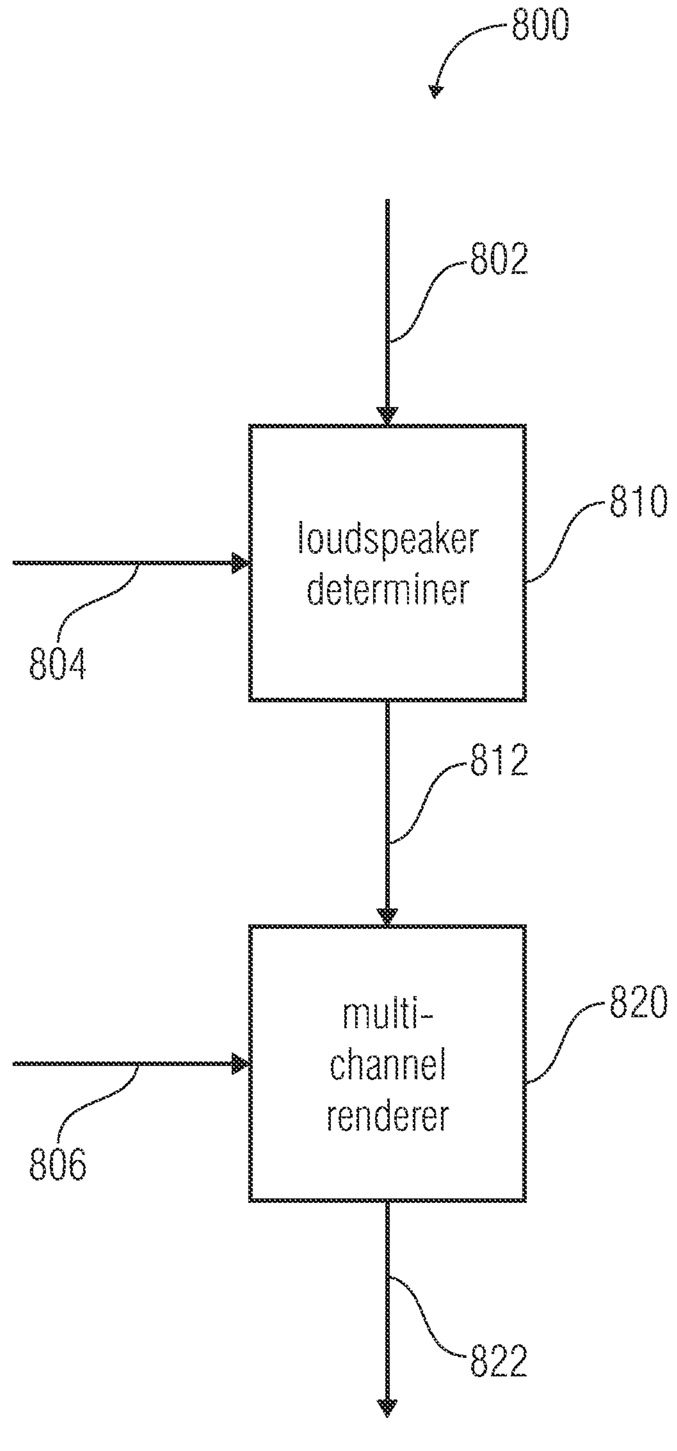
FIG. 8 is a block diagram of an apparatus for providing drive signals for loudspeakers of a loudspeaker arrangement.

FIG. 8 shows a block diagram of an apparatus 800 for providing drive signals 822 for loudspeakers of a loudspeaker arrangement based on an audio signal associated with a virtual source as an embodiment of a further aspect of the present invention. The apparatus 800 comprises a loudspeaker determiner 810 connected to a multi-channel renderer 820. The loudspeaker determiner 810 determines a group of relevant loudspeakers 812 of the loudspeaker arrangement located within a variable angular range around a position 802 of the virtual source. The variable angular range is based on a distance between the position 802 of the virtual source and a predefined listener position 804. The multi-channel renderer 820 calculates driving coefficients for the determined group of relevant loudspeakers 812. Further, the multi-channel renderer 820 provides drive signals 822 to the group of relevant loudspeakers 812 based on the calculated driving coefficients and the audio signal 806 of the virtual source without providing drive signals 822 associated with the virtual source to other loudspeakers than the loudspeakers of the group of relevant loudspeakers 812. For this, for example, a position information 802 (e.g. coordinates) of the virtual source and a position information 804 of the predefined listener position is provided to the loudspeaker determiner 810 and the audio signal 806 of the virtual source is provided to the multi-channel renderer 820.

By adapting the angular range of active loudspeakers around the position 802 of the virtual source depending on the distance between the position 802 of the virtual source and a predefined listener position 804, artifacts due to fast changing active loudspeakers for virtual sources moving close by the predefined listener position 804 can be significantly reduced and therefore, the audio quality can be improved.

This means, especially for a moving virtual source or different virtual sources with different distances to the predefined listener position 804, the variable angular range comprises a first angle for a first distance between a position 802 of a virtual source and the predefined listener position 804 and a second angle for a second distance between a position 802 of a virtual source and the predefined listener position 804. The first angle and the second angle are different for at least two positions of the same virtual source or of different virtual sources, if the first distance and the second distance are different.

The described aspect of the invention shown in FIG. 8 may only be used for focused virtual sources located within an inner area of the loudspeaker arrangement. The inner zone of a loudspeaker arrangement is the area surrounded by the loudspeakers of the loudspeaker arrangement.

In other words, the virtual source may be a moving virtual source and the moving virtual source comprises a first distance to the predefined listener position 804 at a first time and a second distance to the predefined listener position 804 at the second time. In this case, the variable angular range may be larger at the second time than at the first time, if the first distance is larger than the second distance.

For example, the variable angular range increases with decreasing distance between the position of the virtual source and the predefined listener position. This may be valid for at least two different positions of a virtual source. The variable angular range may indicate an variable angle of an amplitude window with amplitude coefficients for loudspeakers >0.

The variable angular range may be aligned symmetrically at both sides (e.g. for 2-dimensional loudspeaker arrangements) or around (e.g. for 3-dimensional loudspeaker arrangements) a line from the predefined listener position 804 to the position 802 of the virtual source and may cover an area opposite to the predefined listener position 804 with respect to the position 802 of the virtual source. In other words, the relevant loudspeakers are mainly located behind the virtual source from the point of view of a listener at the predefined listener position 804. For example, if the position of the virtual source moves closer to the predefined listener position the variable angular range may increase so that also more and more loudspeakers to the left and right of a listener at the predefined listener position 802 may get relevant. In the case of a 3-dimensional loudspeaker arrangement, the variable angular range indicates an opening angle of a spherical sector.

The variable angular range may be equal to or larger than a minimal variable angular range. The minimal variable angular range may be, for example, 180° or even more or less. Further, the variable angular range may be equal to 360°, if the position 802 of the virtual source is equal to the predefined listener position 804.

The predefined listener position again may be a reference point in an inner zone of the loudspeaker arrangement. According to the described concept the audio quality may be improved for a listener located at the predefined listener position 804.

Artifacts due to a fast change of active loudspeakers for moving virtual sources may only appear, if the virtual source is close to the predefined listener position. Therefore, the variable angular range may vary within a listener transition zone surrounding the predefined listener position and may stay constant outside the listener transition zone. In this example, the variable angular range may comprise a minimal angular range outside the listener transition zone. This minimal angular range may be, as already mentioned, for example, 180° or even more or less. Inside the listener transition zone, the variable angular range may increase linearly from the minimal angular range to 360° when the distance of the position of the virtual source and the predefined listener position 804 decreases from a border of the listener transition zone to zero.

The loudspeaker transition zone may be a circle around the predefined listener position, although also another geometry may be possible. A diameter of the listener transition zone may be less than 2 m (or 5 m, 1 m or less) and larger than 0.2 m (or 0.1 m, 0.5 m or more). Alternatively or additionally, a diameter of the listener transition zone may be larger than 10% (or 1%, 20% or more) of a distance between a predefined listener position 804 and a closest loudspeaker of the loudspeaker arrangement.

Figure 9:
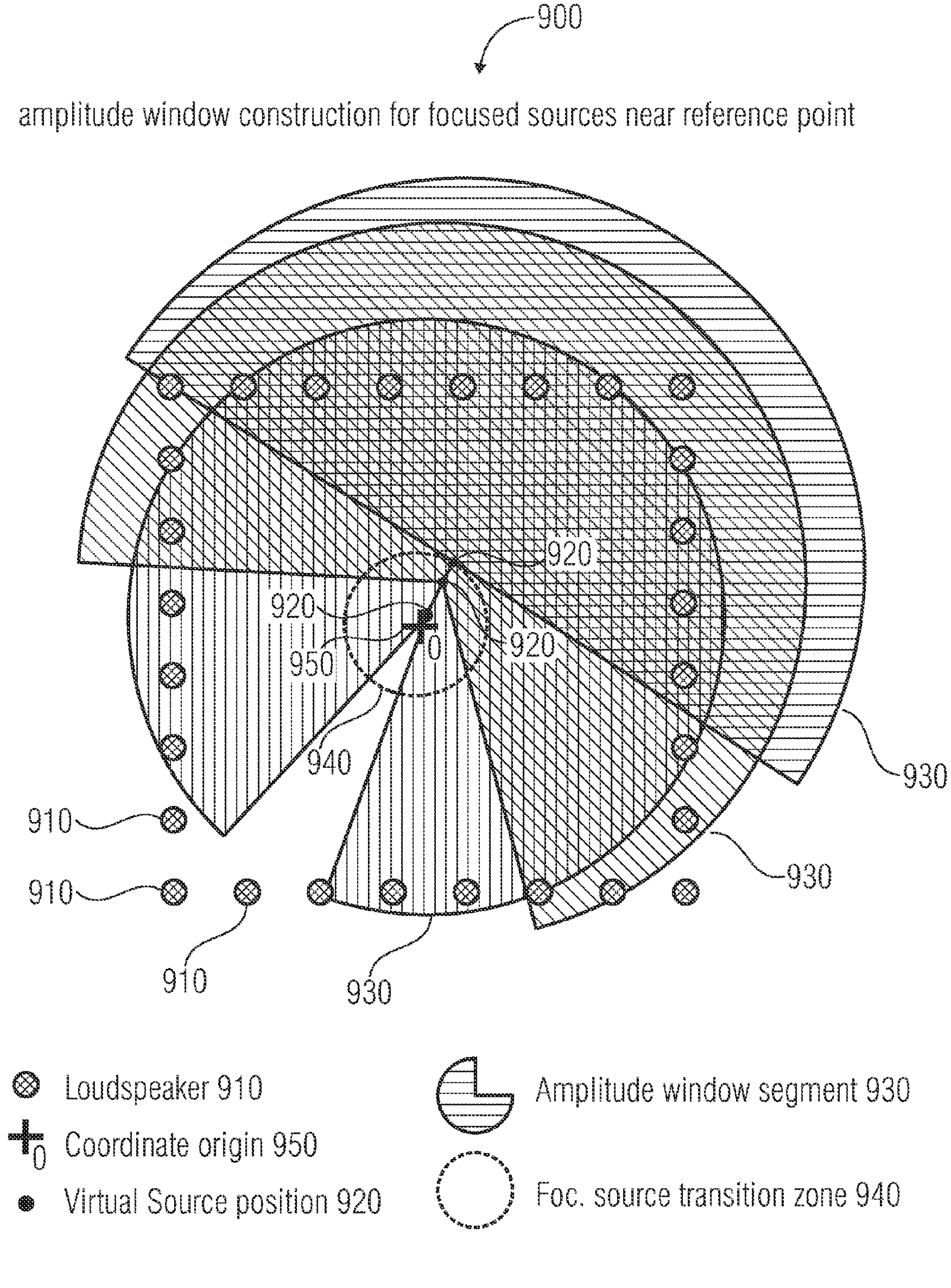
FIG. 9 is a schematic illustration of the variable angular range around the position of a virtual source with different distances to a predefined listener positions.

FIG. 9 shows a schematic illustration 900 of different angular ranges around a virtual source for different distances of the virtual source to the predefined listener position 950. In this example, the loudspeakers 910 of the loudspeaker arrangement are positioned in a square around the predefined listener position 950, which is in this example also the coordinate origin (e.g. for the position information 802 of the virtual source and the position information 804 of the predefined listener position). Further, a listener transition zone 940 as indicated by the dashed circle around the predefined listener position 950. The listener transition zone 940 may also be called focused source transition zone. Further, the angular ranges 930, also called amplitude window segment, for three different positions 920 of a virtual source are illustrated. As it can be seen, the variable angular range 930 increases from a minimal angular range (in this example) 180° at the border of the listener transition zone 940 to almost 360° when the position 920 of the virtual source nearly reaches the predefined listener position 950. In other words, FIG. 9 illustrates an example for an amplitude window construction (variable angular range determination) for focused sources (virtual sources with an associated position within the inner area of the loudspeaker arrangement) near a reference point (a predefined listener position).

The loudspeaker determiner 810 may calculate the variable angular range by itself or may comprise a storage unit with a lookup table containing information of different groups of relevant loudspeaker for different distances and directions between the position of the virtual source and the predefined listener position or more general for different positions of the virtual source. In this case, the loudspeaker determiner may determine the relevant loudspeakers based on the information contained by the lookup table. The lookup table may contain for a plurality of different possible discrete positions (or distances and directions) of a virtual source a group of relevant loudspeakers of the loudspeaker arrangement. So, the loudspeaker determiner may only need to determine, for example, the discrete position closest to the position of the virtual source to obtain the group of relevant loudspeakers associated with the closest discrete position stored by the lookup table.

The coefficient calculation for focused sources in conventional implementations of the wave field synthesis determines the amplitude coefficients by dividing the plane/the space into two halves, by constructing a separating line/plane containing the reference points of the system and whose normal vector passes from the reference point to the source position. In the half containing the source, the loudspeakers are regarded as relevant and are involved in the sound reproduction by an amplitude factor >0. The loudspeaker in the other half remain in active. What is noticeable here is source movements close to the reference point which may lead to abrupt changes of the amplitude window (change of active loudspeakers).

The proposed concept leads to a gradual change of the coefficient distribution close to the reference point. The approach is based on the considerations of the angle separation between the above-mentioned normal (vector) and the vectors from the source to the loudspeakers. If the same is smaller than a source position dependent critical angle (variable angular range), then the corresponding loudspeakers are regarded as relevant and receive amplitude coefficient >0. If this critical angle constantly is the right-angle, this method corresponds to current implementations of the wave field synthesis. By the proposed change, the critical angle as follows depends on the source position. If the source is further apart from the reference point then a configurable critical or limiting distance (border of the listener transition zone), then the critical angle is further a right-angle. Under the limiting distance, the limiting angle increases to 180° with a decreasing distance. This leads to the fact that with a source at the reference point, all loudspeakers are relevant and activated. By the form of the angle increase, the performance of this concept may be adapted.

The described concept provides, for example, means for realizing a steady performance of focused sources (focused virtual sources) close to the system reference point (predefined listener position).

Around the reference point (predefined listener position, origin) of the reproduction system (loudspeaker arrangement) shown in FIG. 9 a circle with a certain radius may be constructed. Outside this circle, focused sources with an amplitude window with constant variable angular range may be determined. Amplitude window spans with regard to the source position on one side of a straight line, the straight line containing the source position and is constructed perpendicular the radial direction. The hedged areas show the direction of active loudspeakers with regard to the source position. This is represented by the outermost of the three source positions. The source is positioned on the outside of the border of the circle. A hedged semicircle indicates the construction. The semicircle practically represents an opening angle. If the source further approaches the origin, instead of a straight line, an angle segment divides the plane which closes more and more with a decreasing distance to the origin. This has the consequence of an expansion of the amplitude window (see closing circle segments). At the origin a closed area of a circle results—here all loud speakers would be active. The two closing circle segments show this tendency. An abrupt switching over of complete loudspeaker distributions may, thus, be avoided. In this way, an example for the change of an opening angle (variable angular range) in dependency on the distance between the source with regard to the border radius is shown qualitatively.

As already mentioned before, although also this embodiment is described with regard to one virtual source, also a plurality of virtual sources may be processed according to this aspect of the invention. For example, the loudspeaker determiner may determine a second (or a plurality) of group of relevant loudspeakers of the loudspeaker arrangement located within a second variable angular range (a plurality of different variable angular ranges) around a position of a second (of a respective) virtual source. The second variable angular range is based on a distance between the position of the second virtual source and the predefined listener position and the multi-channel renderer 820 calculates driving coefficients for the second group of relevant loudspeakers and provides drive signals to the second group of relevant loudspeakers based on the calculated driving coefficients and an audio signal of the second virtual source without providing drive signals of the second virtual source to other loudspeaker than the loudspeakers of a second group of relevant loudspeakers. In this case, a drive signal of a virtual source is only provided to a loudspeaker, if the loudspeaker is contained by the group of relevant loudspeakers associated with the respective virtual source. For example, if a loudspeaker is contained by the (first, already mentioned) group of relevant loudspeakers and the second group of relevant loudspeakers, the multi-channel renderer 820 provides drive signals of the (first) virtual source and the second virtual source. Similarly, if a loudspeaker is only contained by one of both groups, only the respective drive signals are provided to the loudspeaker and if a loudspeaker is contained by none of the groups of relevant loudspeakers, none of the drive signals are provided to this loudspeaker.

The multi-channel renderer 820 and/or the loudspeaker determiner 810 may be independent hardware units, part of a computer, microcontroller or digital signal processor as well as a computer program or software product for running on a computer, microcontroller or digital signal processor.

Figure 12:
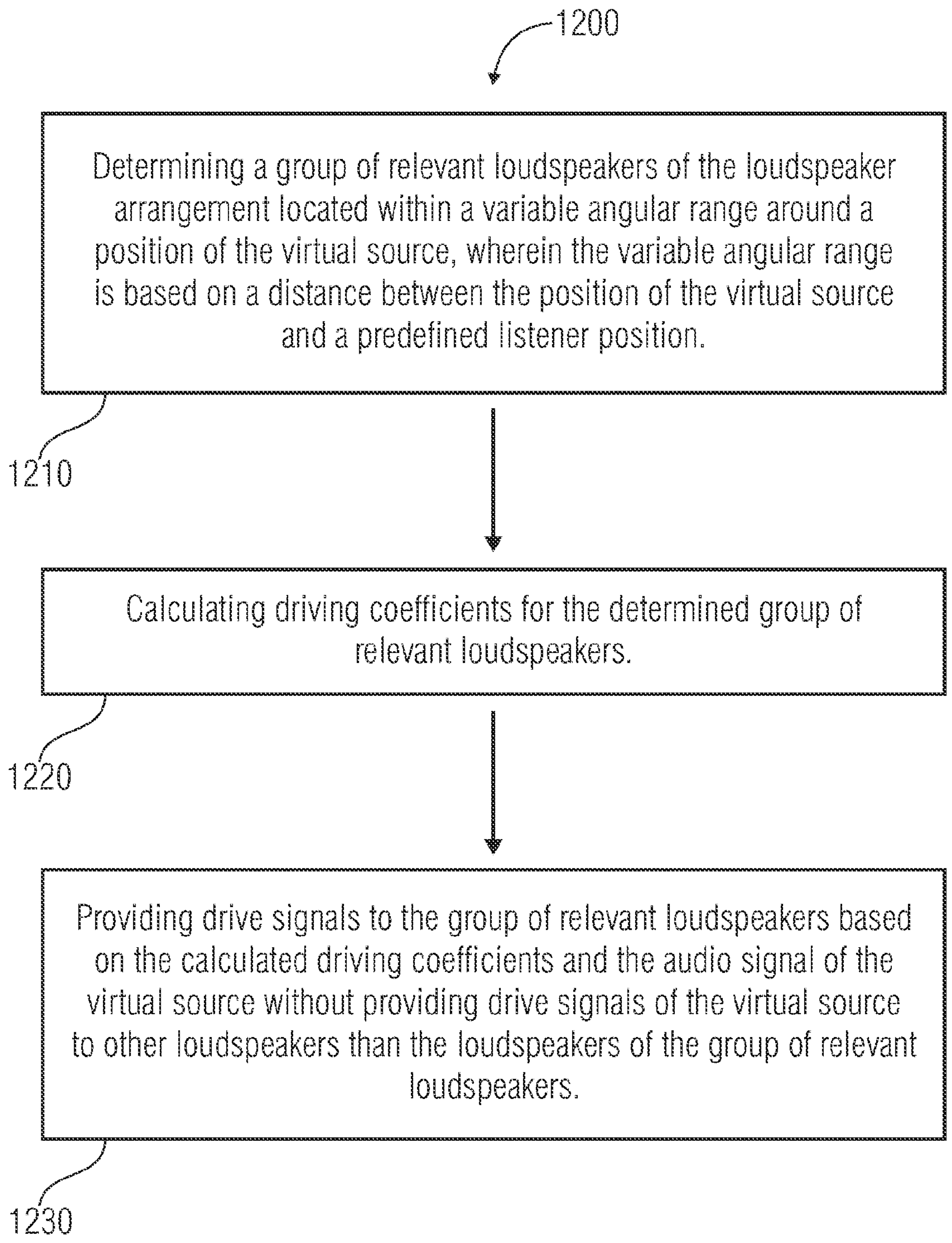
FIG. 12 is a flowchart of a method for providing drive signals for loudspeakers of a loudspeaker arrangement.

FIG. 12 shows a flowchart of a method 1200 for providing drive signals for loudspeakers of a loudspeaker arrangement based on an audio signal associated with a virtual source according to an embodiment of the invention. The method 1200 comprises determining 1210 a group of relevant loudspeakers of the loudspeaker arrangement located within a variable angular range around a position of the virtual source. The variable angular range is based on a distance between the position of the virtual source and a predefined listener position. Further, the method comprises calculating 1220 driving coefficients for the determined group of relevant loudspeakers and providing 1230 drive signals to the group of relevant loudspeakers based on the calculated driving coefficients and the audio signal of the virtual source without providing drive signals of the virtual source to other loudspeakers than the loudspeakers of the group of relevant loudspeakers.

Additionally, the method 1200 may comprise one or more further steps corresponding to the optional features of the described concept mentioned above.

According to another aspect of the present invention, a plurality of different predefined listener positions are considered for the calculation of driving coefficients for a loudspeaker. In this example, for each predefined listener position driving coefficients are calculated for a loudspeaker and this plurality of driving coefficients are combined (e.g. by linear combination) to obtain combined driving coefficients for the loudspeaker.

By considering driving coefficients for a plurality of predefined listener positions the audio quality is not only optimized for one predefined listener position, but the audio quality may be improved for a whole listener area.

In this way, means for a listener dependent determination of suitable amplitude windows for a sound reproduction with, for example, non-focused virtual sources can be realized.

The selection of the amplitude values, by which an input signal is conducted to the different loudspeakers of a reproduction system, among others influences the local perception of the resulting sound event. In particular, in case of several possible positions of the listener, i.e., an extended area for the listener (listener zone), a broader area of loudspeakers has to be provided with the signal to be reproduced in order to enable the direction-correct localization of the sound even in the correction direction.

Under this premise, a concept for determining amplitude coefficients is proposed considering a defined listener area. The system reference point is determined as a listener position from the listener area which may be varied for the purpose of sampling the listener zone. On the basis of this reference point the following amplitude window calculations are executed.

The basis of the method is a model amplitude window of a predetermined form which is used to calculate partial amplitude coefficients for the loudspeakers from the relative position of reference point, source position and loudspeaker position. Here, first of all the angle distance between all loudspeaker positions and the source positions is determined from the view of the reference point. The above-mentioned windowing function gives a relative amplitude value for each of those angular separations. Typically, a loudspeaker located exactly in the direction of the source from the point of view of the reference point receives the highest partial amplitude value of all loudspeakers. Depending on the form of the model window, based on the reference point consequently a circle (2D) or spherical sector (3D) results from this windowing, in which a partial amplitude coefficient is allocated to the loudspeakers depending on their position. By sampling the defined listener range, now a series of calculations of a same type is executed for different reference points which each result in a set of partial amplitude coefficients (driving coefficients) for all loudspeakers (or for all relevant loudspeakers). Adding up the same results in the result amplitude distribution which is now possibly after further processing steps used for the further audio reproduction.

With the selection of the listener range, the model amplitude window and the sampling parameters thus a parametric adaptation of the reproduction method to different requirements may be executed. Possible model amplitude windows may be among others be based on a modified cos function.

Figure 7:
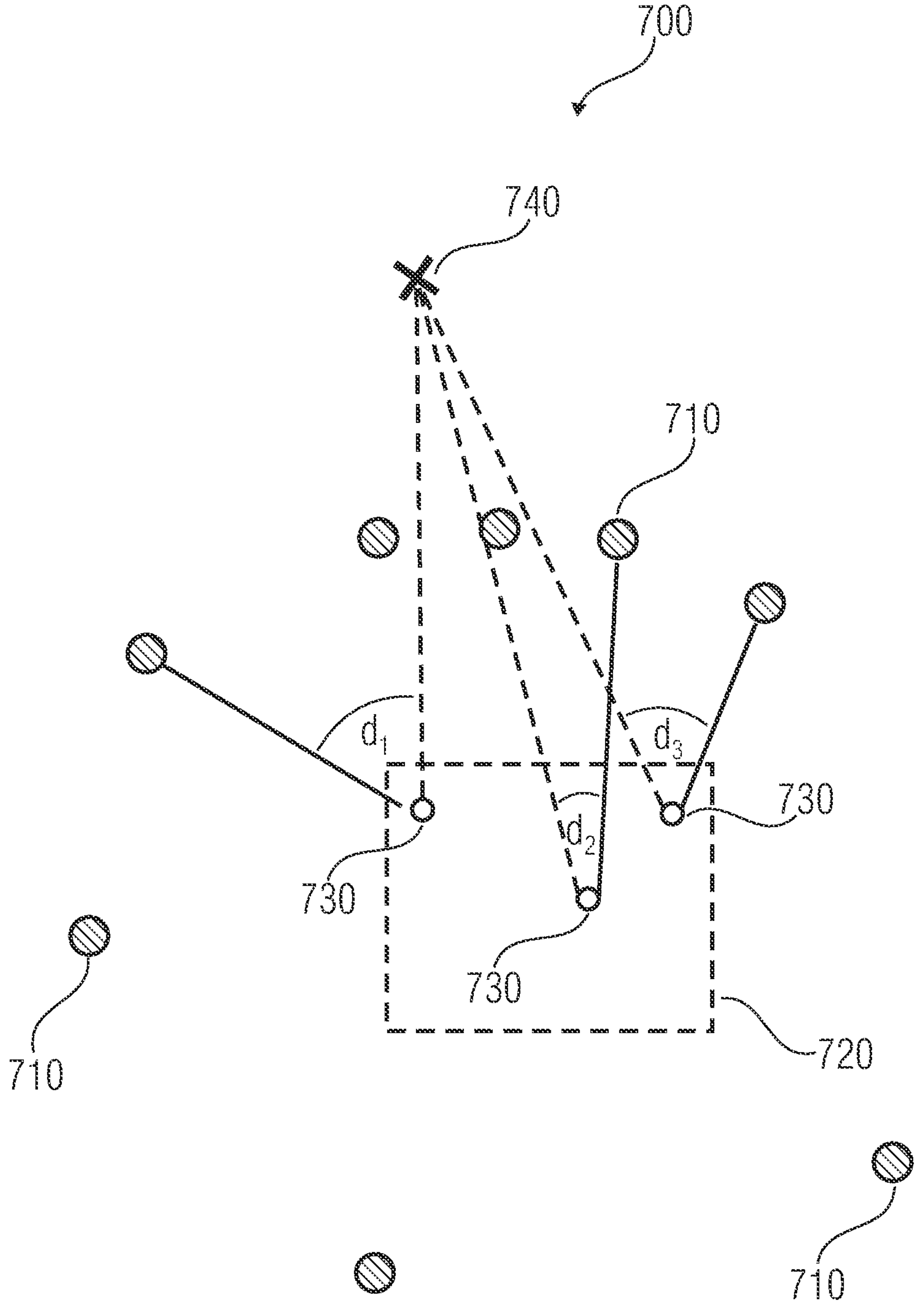
FIG. 7 is a schematic illustration of the calculation of a plurality of different driving coefficients for different predefined listener positions for a virtual source.

FIG. 7 shows a schematic illustration 700 of loudspeaker 710 of a loudspeaker arrangement with three different predefined listener positions 730 within a listener zone 720 inside the loudspeaker arrangement. Since the angles between a virtual source 740 and the loudspeaker 710 of the loudspeaker arrangement are different for each different predefined listener position 730, the calculated partial amplitude coefficients (driving coefficients) for the same loudspeakers are different for the different predefined listener positions 730.

Generally, although the different aspects of the present invention are described independent from each other, one or more of them may also be combined.

For example, the loudspeaker transition zone mentioned in connection with the apparatus 100 for calculating driving coefficients for loudspeakers of the loudspeaker arrangement for an audio signal associated with a virtual source as shown in FIG. 1 may comprise a border with a minimal distance to a loudspeaker of the loudspeaker arrangement depending on a distance between the loudspeaker and a loudspeaker adjacent to this loudspeaker. Further, the loudspeaker arrangement may comprise at least two pairs of adjacent loudspeakers with different distances between the loudspeakers of the respective pair of loudspeakers. In this example, the consideration of subdriving coefficients according to different calculation rules for a virtual source positioned within the loudspeaker transition zone is combined with the consideration of a loudspeaker transition zone with variable width. Therefore, a transition between the inner zone of a loudspeaker arrangement and the loudspeaker transition zone, between the inner area of the loudspeaker transition zone and the outer area of the loudspeaker transition zone and between the loudspeaker transition zone and the outer area of the loudspeaker arrangement for a moving virtual source can be implemented very smoothly and the audio quality can be significantly improved.

In this way, a means for determining a steady indicator for describing the position of a virtual source and a means for realizing transition zones of variable widths may be realized, for example.

Additionally or alternatively, the apparatus 100 shown in FIG. 1 may comprise a loudspeaker determiner, which determines a group of relevant loudspeakers of the loudspeaker arrangement located within a variable angular range around a position of the virtual source. The variable angular range is based on a distance between the position of the virtual source and a predefined listener position. Further, the multi-channel renderer may provide drive signals to the group of relevant loudspeakers based on the calculated driving coefficients and the audio signal of the virtual source without providing drive signals of the virtual source to other loudspeakers than the loudspeakers of the group of relevant loudspeakers. In this way, artifacts due to transitions between inner zone, transition zone and outer zone as well as artifacts due to fast activating of loudspeakers for a virtual source moving close to the predefined listener position can be reduced and the audio quality can be significantly improved.

Further additionally or alternatively, the apparatus 100 shown in FIG. 1 may calculate a plurality of driving coefficients for a loudspeaker of the loudspeaker arrangement based on a plurality of different predefined listener positions and may combine the plurality of driving coefficients of the loudspeaker to obtain combined driving coefficients for the loudspeaker.

Further, also the apparatus 500 shown in FIG. 5*a* may be the starting point. In this case, the apparatus 500 for calculating driving coefficients for loudspeakers of the loudspeaker arrangement for an audio signal associated with a virtual source may comprise a multi-channel renderer 510 configured to calculate driving coefficients for loudspeakers of the loudspeaker arrangement based on the driving coefficients calculated according to the first calculation rule and the driving coefficients calculated according to the second calculation rule, if a position of the virtual source is located within an inner area of the loudspeaker transition zone. Further, the multi-channel renderer is configured to calculate driving coefficients for loudspeakers of the loudspeaker arrangement according to a third calculation rule and configured to calculate driving coefficients for the same loudspeakers based on the driving coefficients calculated according to the second calculation rule and the driving coefficients calculated according to the third calculation rule, if a position of the virtual source is located within an outer area of the loudspeaker transition zone.

Additionally or alternatively, the apparatus 500 shown in FIG. 5*a* may comprise a loudspeaker determiner configured to determine a group of relevant loudspeakers of a loudspeaker arrangement located within a variable angular range around a position of the virtual source. The variable angular range is based on a distance between the position of the virtual source and a predefined listener position. Further, the multichannel renderer 510 may provide drive signals to the group of relevant loudspeakers based on the calculated driving coefficients and the audio signal of the virtual source without providing drive signals of the virtual source to other loudspeakers than the loudspeakers of the group of relevant loudspeakers. In this way, artifacts due to different distances between the loudspeakers of the loudspeaker arrangement and due to a fast change of active loudspeakers for moving virtual sources close to the predefined listener position may be reduced and the audio quality may be improved significantly.

Further, additionally or alternatively, the apparatus 200 may comprise a multi-channel renderer 510 configured to calculate a plurality of driving coefficients for a loudspeaker of the loudspeaker arrangement based on a plurality of different predefined listener positions and may be configured to combine the plurality of driving coefficients of the loudspeaker to obtain combined driving coefficients for the loudspeakers.

Further, also apparatus 800 shown in FIG. 8 may be the starting point for a combination of the different aspects of the invention. For example, the apparatus 800 shown in FIG. 8 may comprise a multi-channel renderer configured to calculate first subdriving coefficients for loudspeakers of the loudspeaker arrangement according to a first calculation rule, configured to calculate second subdriving coefficients for the same loudspeakers according to a second calculation rule and configured to calculate driving coefficients for the same loudspeakers based on the first subdriving coefficients and the second subdriving coefficients, if a position of the virtual source is located within an inner area of a loudspeaker transition zone. Further, the multi-channel renderer 820 may calculate second subdriving coefficients for loudspeakers of the loudspeaker arrangement according to the second calculation rule, may calculate third subdriving coefficients for the same loudspeakers according to a third calculation rule and may calculate driving coefficients for the same loudspeakers based on the second subdriving coefficients and the third subdriving coefficients, if a position of the virtual source is located within an outer area of the loudspeaker transition zone. The loudspeaker transition zone separates an inner zone of the loudspeaker arrangement and an outer zone of the loudspeaker arrangement and the loudspeakers of the loudspeaker arrangement are located within the transition zone. Further, the second calculation rule is different from the first calculation rule and the third calculation rule. In this case, artifacts due to transitions of a moving virtual source between the inner zone of the loudspeaker arrangement, the loudspeaker transition zone and the outer zone of the loudspeaker arrangement as well as artifacts due to moving virtual sources close to the predefined listener position may be reduced and the audio quality may be significantly improved.

Additionally or alternatively, the apparatus 800 may comprise a multi-channel renderer 820 configured to calculate driving coefficients for loudspeakers of the loudspeaker arrangement based on a first calculation rule, if a position of the virtual source is located outside a loudspeaker transition zone and configured to calculate driving coefficients for loudspeakers of the loudspeaker arrangement based on a second calculation rule, if the position of the virtual source is located within the loudspeaker transition zone. A border of the loudspeaker transition zone comprises a minimal distance to a loudspeaker of the loudspeaker arrangement depending on the distance between the loudspeaker and a loudspeaker adjacent to this loudspeaker. Further, the loudspeaker arrangement comprises at least two pairs of adjacent loudspeakers with different distances between the loudspeakers of the respective pair of loudspeakers.

Further, additionally or alternatively, the apparatus 800 may comprise a multi-channel renderer 820 configured to calculate a plurality of driving coefficients for a loudspeaker of a loudspeaker arrangement based on a plurality of predefined listener positions and configured to combine the plurality of driving coefficients of the loudspeaker to obtain combined driving coefficients for the loudspeaker.

Some embodiments of the invention relate to components of a scalable sound reproduction method for an object-oriented reproduction of audio scenes.

The components described in the above may be used as components of an audio reproduction method suitable for an object oriented reproduction of audio scenes. In this connection, an audio scene is the combination of a series of audio signals to which an object oriented description of the characteristics of sound sources is allocated (same principle as the characteristics of virtual sources in practical realizations of the wave field synthesis), i.e., positions of the sound source and other special characteristics of the sound source (e.g., manual signal distortions, type of virtual source, reproduction level).

The sound reproduction concept referred to here in particular designates those methods which may control a system having several loudspeakers by means of suitable signals on a signal processing means. This happens by the system processing the description of the loudspeaker setup as well as the object oriented description of the audio scene. Results of this processing is tables of filter coefficients (so-called driving coefficients) which may be expressed in the simplest case as pairs of signal distortion values and amplitude weighting factors (level changes). In signal processing systems, these coefficients may be applied in a processing matrix to the incoming audio signals to be able to control each loudspeaker of the output system.

The scalability of the sound reproduction method mentioned here relates to the variability of the loudspeaker setup that may be controlled by the method. Under the condition that a defined location or area of the listener is surrounded by the loudspeakers to be controlled, the loudspeaker may be arranged in different intervals (i.e., the number of loudspeakers to be controlled may vary in a wide range). The condition of surrounding in the 2D case results in a ring of at least three loudspeakers as a smallest theoretical arrangement of loudspeakers, while typical wave field thesis reproduction systems with several hundred loudspeakers represents the upper limit for the 2D case. In the 3D case, the above-mentioned condition theoretically leads to a tetrahedron type body at the corners of which the loudspeakers of this smallest possible system are positioned. Also in this case, the number of loudspeakers of the envelope surface may be strongly increased. In this sense, scalability refers to the variability of the loudspeaker number under predetermined boundary conditions.

The approaches described in the following refer to the calculation of suitable driving coefficients and here describe the simplified case of coefficients in the form of delay value and amplitude weighting value.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for calculating driving coefficients for loudspeakers of a loudspeaker arrangement for an audio signal associated with a virtual source, the apparatus comprising:

a multi-channel renderer configured to calculate first subdriving coefficients for loudspeakers of the loudspeaker arrangement according to a first calculation rule, configured to calculate second subdriving coefficients for the same loudspeakers according to a second calculation rule and configured to calculate driving coefficients for the same loudspeakers based on the first subdriving coefficients and the second subdriving coefficients, if a position of the virtual source is located within an inner area of a loudspeaker transition zone, wherein the multi-channel renderer is configured to calculate second subdriving coefficients for loudspeakers of the loudspeaker arrangement according to the second calculation rule, configured to calculate third subdriving coefficients for the same loudspeakers according to a third calculation rule and configured to calculate driving coefficients for the same loudspeakers based on the second subdriving coefficients and the third subdriving coefficients, if a position of the virtual source is located within an outer area of the loudspeaker transition zone, wherein the second calculation rule is different from the first calculation rule and the third calculation rule, wherein the second calculation rule comprises an amplitude panning algorithm, wherein the transition zone separates an inner zone of the loudspeaker arrangement and an outer zone of the loudspeaker arrangement, wherein the loudspeakers of the loudspeaker arrangement are located within the transition zone.

2. The apparatus according to claim 1, wherein the first calculation rule is different from the third calculation rule.

3. The apparatus according to claim 1, wherein the multi-channel renderer is configured to calculate the driving coefficients for the same loudspeakers based on a linear combination of the first subdriving coefficients and the second subdriving coefficients, if a position of the virtual source is located within the inner area of the loudspeaker transition zone, and wherein the multi-channel renderer is configured to calculate the driving coefficients for the same loudspeakers based on a linear combination of the second subdriving coefficients and third subdriving coefficients, if a position of the virtual source is located within the outer area of the loudspeaker transition zone.

4. The apparatus according to claim 1, wherein the multi-channel renderer is configured to calculate the driving coefficients for the same loudspeakers based on the first subdriving coefficients, the second subdriving coefficients and the third subdriving coefficients, wherein a weighting factor for the first subdriving coefficients is larger than a weighting factor for the third subdriving coefficients, if a position of the virtual source is located within the inner area of the loudspeaker transition zone, and wherein a weighting factor for the first subdriving coefficients is lower than a weighting factor for the third subdriving coefficients, if a position of the virtual source is located within the outer area of the loudspeaker transition zone.

5. The apparatus according to claim 1, wherein the multi-channel renderer is configured to provide the first subdriving coefficients as driving coefficients for loudspeakers of the loudspeaker arrangement without considering the second subdriving coefficients and the third subdriving coefficients, if a position of the virtual source is located in the inner zone of the loudspeaker arrangement, and wherein the multi-channel renderer is configured to provide the third subdriving coefficients as driving coefficients for loudspeakers of the loudspeaker arrangement without considering the first subdriving coefficients and the second subdriving coefficients, if a position of the virtual source is located in the outer zone of the loudspeaker arrangement.

6. The apparatus according to claim 1, wherein the first calculation rule is based on $$a_{nm} = \sqrt{\frac{\zeta_m}{\zeta_m - 1}} \frac{\cos\varphi_{nm}}{\sqrt{r_{nm}}},$$

$$\tau_{nm} = \tau_0 - \text{sign}(\zeta_m)\frac{r_{nm}}{c}.$$

wherein $a_{mn}$ is a weighting coefficient for a primary source signal m and a secondary source (loudspeaker) n, $\tau_{mn}$ is a time delay for a primary source signal m and a secondary source (loudspeaker) n, $\zeta_m$ denotes a ratio between a signed z-coordinate of a reference line and a primary source, $r_n$ is a distance of a rendered virtual source to a secondary source (loudspeaker) with index n, and $\phi_{nm}$ denotes an angle of incidence from a primary source m at a secondary source n line.

7. The apparatus according to claim 1, comprising a combiner, wherein the multi-channel renderer is configured to calculate driving coefficients for loudspeakers of the loudspeaker arrangement for a second virtual source, wherein the multi-channel renderer is configured to generate an adapted audio signal for the virtual source and an adapted audio signal for the second virtual source based on the calculated driving coefficients of the respective virtual source and the audio signal associated with the respective virtual source, wherein the combiner is configured to combine the adapted audio signal of the virtual source and the adapted audio signal of the second virtual source to acquire an output audio signal for a loudspeaker of the loudspeaker arrangement.

8. The apparatus according to claim 1, wherein a border of the loudspeaker transition zone comprises a minimal distance to a loudspeaker of the loudspeaker arrangement larger than 0.2 m and lower than 2 m.

9. The apparatus according to claim 1, wherein a border of the loudspeaker transition zone comprises a minimal distance to a loudspeaker of the loudspeaker arrangement larger than 20% of a distance between the loudspeaker and an adjacent loudspeaker of the loudspeaker arrangement and lower than two times the distance between the loudspeaker and the adjacent loudspeaker of the loudspeaker arrangement.

10. The apparatus according to claim 1, wherein the multi-channel renderer is configured to determine an indicator value based on a ratio of a minimal distance between the position of the virtual source located within the loudspeaker transition zone and a border between the inner area of the loudspeaker transition zone and the outer area of the loudspeaker transition zone and a minimal distance between a border of the loudspeaker transition zone and a border between the inner area of the loudspeaker transition zone and the outer area of the loudspeaker transition zone, wherein the multi-channel renderer is configured to calculate the driving coefficients by weighting the first subdriving coefficients and the second subdriving coefficients based on the indicator value or by weighting the second subdriving coefficients and the third subdriving coefficients based on the indicator value.

11. The apparatus according to claim 1, wherein the multi-channel renderer is configured to calculate a plurality of driving coefficients for a loudspeaker of the loudspeaker arrangement based on a plurality of different predefined listener positions and configured to combine the plurality of driving coefficients of the loudspeaker to acquire combined a driving coefficient for the loudspeaker.

12. The apparatus according to claim 1, wherein a border of the loudspeaker transition zone comprises a minimal distance to a loudspeaker of the loudspeaker arrangement depending on a distance between the loudspeaker and a loudspeaker adjacent to this loudspeaker, wherein the loudspeaker arrangement comprises at least two pairs of adjacent loudspeakers with different distances between the loudspeakers of the respective pair of loudspeakers.

13. The apparatus according to claim 1, comprising a loudspeaker determiner configured to determine a group of relevant loudspeakers of the loudspeaker arrangement located within a variable angular range around a position of the virtual source, wherein the variable angular range is based on a distance between the position of the virtual source and a predefined listener position, wherein the multi-channel renderer is configured to calculate driving coefficients for the determined group of relevant loudspeakers, wherein the multi-channel renderer is configured to provide drive signals to the group of relevant loudspeakers based on the calculated driving coefficients and the audio signal of the virtual source without providing drive signals of the virtual source to other loudspeakers than the loudspeakers of the group of relevant loudspeakers.

14. A method for calculating coefficients for loudspeakers of a loudspeaker arrangement for an audio signal associated with a virtual source, the method comprising:

calculating first subdriving coefficients for loudspeakers of the loudspeaker arrangement according to a first calculation rule, calculating second subdriving coefficients for the same loudspeakers according to a second calculation rule and calculating driving coefficients for the same loudspeakers based on the first subdriving coefficients and the second subdriving coefficients, if a position of the virtual source is located within an inner area of a loudspeaker transition zone; and calculating second subdriving coefficients for loudspeakers of the loudspeaker arrangement according to the second calculation rule, calculating third subdriving coefficients for the same loudspeakers according to a third calculation rule and calculating driving coefficients for the same loudspeakers based on second subdriving coefficients and the third subdriving coefficients, if a position of the virtual source is located within an outer area of the loudspeaker transition zone, wherein the second calculation rule is different from the first calculation rule and the third calculation rule, wherein the second calculation rule comprises an amplitude panning algorithm, wherein the loudspeaker transition zone separates an inner zone of the loudspeaker arrangement and an outer zone of the loudspeaker arrangement, wherein the loudspeakers of the loudspeaker arrangement are located within the loudspeaker transition zone.

15. A non-transitory computer readable medium including a computer program including program code for performing, when the computer program runs on a computer or a microcontroller, a method for calculating coefficients for loudspeakers of a loudspeaker arrangement for an audio signal associated with a virtual source, the method comprising:

calculating first subdriving coefficients for loudspeakers of the loudspeaker arrangement according to a first calculation rule, calculating second subdriving coefficients for the same loudspeakers according to a second calculation rule and calculating driving coefficients for the same loudspeakers based on the first subdriving coefficients and the second subdriving coefficients, if a position of the virtual source is located within an inner area of a loudspeaker transition zone; and calculating second subdriving coefficients for loudspeakers of the loudspeaker arrangement according to the second calculation rule, calculating third subdriving coefficients for the same loudspeakers according to a third calculation rule and calculating driving coefficients for the same loudspeakers based on second subdriving coefficients and the third subdriving coefficients, if a position of the virtual source is located within an outer area of the loudspeaker transition zone, wherein the second calculation rule is different from the first calculation rule and the third calculation rule, wherein the second calculation rule comprises an amplitude panning algorithm, wherein the loudspeaker transition zone separates an inner zone of the loudspeaker arrangement and an outer zone of the loudspeaker arrangement, wherein the loudspeakers of the loudspeaker arrangement are located within the loudspeaker transition zone.

16. An apparatus for providing drive signals for loudspeakers of a loudspeaker arrangement based on an audio signal associated with a virtual source, the apparatus comprising:

a loudspeaker determiner configured to determine a group of relevant loudspeakers of the loudspeaker arrangement located within a variable angular range around a position of a virtual source, wherein the variable angular range is defined by a distance between the position of the virtual source and a predefined listener position, wherein the variable angular range is defined by a first angle comprising a vertex at a first position of the virtual source for a first distance between the first position of the virtual source and the predefined listener position and by a second angle comprising a vertex at a second position of the virtual source for a second distance between the second position of the virtual source and the predefined listener position, wherein the first distance is different from the second distance, and wherein the first angle comprises a first angle value and the second angle comprises a second angle value, wherein the first value is different from the second value, wherein the virtual source is a focused virtual source located within an inner area of the loudspeaker arrangement; and a multi-channel renderer configured to calculate driving coefficients for the determined group of relevant loudspeakers, wherein the multi-channel renderer is configured to provide drive signals to the group of relevant loudspeakers based on the calculated driving coefficients and the audio signal of the virtual source without providing drive signals of the virtual source to other loudspeakers than the loudspeakers of the group of relevant loudspeakers.

17. The apparatus according to claim 16, wherein the loudspeaker determiner is configured to calculate the variable angular range based on the distance between the position of the virtual source and the predefined listener position.

18. The apparatus according to claim 16, wherein the loudspeaker determiner comprises a storage unit with a lookup table comprising information of different groups of relevant loudspeakers for different positions of the virtual source, wherein the loudspeaker determiner is configured to determine the group of relevant loudspeakers based on the information comprised by the lookup table.

19. The apparatus according to claim 16, wherein the variable angular range increases with decreasing distance between the position of the virtual source and the predefined listener position.

20. The apparatus according to claim 16, wherein the variable angular range is always equal to or larger than 180° for a virtual source located within an inner area of the loudspeaker arrangement.

21. The apparatus according to claim 16, wherein the variable angular range is equal to 360°, if the position of the virtual source is equal to the predefined listener position.

22. The apparatus according to claim 16, wherein the variable angular range varies within a listener transition zone surrounding the predefined listener position and stays constant outside the listener transition zone.

23. The apparatus according to claim 22, wherein the variable angular range comprises a minimal angular range outside the listener transition zone.

24. The apparatus according to claim 23, wherein the variable angular range increases linearly from the minimum angular range to 360° when the distance between the position of the virtual source and the predefined listener position decreases from a border of the listener transition zone to zero.

25. The apparatus according to claim 23, wherein a diameter of a listener transition zone is less than 2 m and larger than 0.2 m.

26. The apparatus according to claim 23, wherein a diameter of the listener transition zone is larger than 10% of a distance between the predefined listener position and a loudspeaker closest to the predefined listener position.

27. The apparatus according to claim 16, wherein the loudspeaker determiner is configured to determine a second group of relevant loudspeakers of the loudspeaker arrangement located within a second variable angular range around a position of a second virtual source, wherein the second variable angular range is based on a distance between the position of the second virtual source and the predefined listener position, wherein the multi-channel renderer is configured to calculate driving coefficients for the determined second group of relevant loudspeakers, wherein the multi-channel renderer is configured to provide drive signals to the second group of relevant loudspeakers based on the calculated driving coefficients and an audio signal of the second virtual source without providing drive signals of the second virtual source to other loudspeakers than the loudspeakers of the second group of relevant loudspeakers, so that a drive signal of a virtual source is only provided to a loudspeaker, if the loudspeaker is comprised by the group of relevant loudspeakers associated with the respective virtual source.

28. The apparatus according to claim 16, wherein the virtual source is a moving virtual source, wherein the moving virtual source comprises a first distance to the predefined listener position at a first time and a second distance to the predefined listener position at a second time, wherein the variable angular range is larger at the second time than at the first time, if the first distance is larger than the second distance.

29. The apparatus according to claim 16, wherein the multi-channel renderer is configured to calculate a plurality of driving coefficients for a loudspeaker of the loudspeaker arrangement based on a plurality of different predefined listener positions and configured to combine the plurality of driving coefficients of the loudspeaker to acquire a combined driving coefficient for the loudspeaker.

30. The apparatus according to claim 16, wherein the multi-channel renderer is configured to calculate first subdriving coefficients for loudspeakers of the loudspeaker arrangement according to a first calculation rule, configured to calculate second subdriving coefficients for the same loudspeakers according to a second calculation rule and configured to calculate driving coefficients for the same loudspeakers based on the first subdriving coefficients and the second subdriving coefficients, if a position of the virtual source is located within an inner area of a loudspeaker transition zone, wherein the multi-channel renderer is configured to calculate second subdriving coefficients for loudspeakers of the loudspeaker arrangement according to the second calculation rule, configured to calculate third subdriving coefficients for the same loudspeakers according to the third calculation rule and configured to calculate driving coefficients for the same loudspeakers based on the second subdriving coefficients and the third subdriving coefficients, if a position of the virtual source is located within an outer area of the loudspeaker transition zone, wherein the second calculation rule is different from the first calculation rule.

31. The apparatus according to claim 16, wherein the multi-channel renderer is configured to calculate driving coefficients for loudspeakers of the loudspeaker arrangement based on a first calculation rule, if a position of the virtual source is located outside a loudspeaker transition zone, and configured to calculate driving coefficients for loudspeakers of the loudspeaker arrangement based on a second calculation rule, if the position of the virtual source is located within the loudspeaker transition zone, wherein a border of the loudspeaker transition zone comprises a minimal distance to a loudspeaker of the loudspeaker arrangement depending on a distance between the loudspeaker and a loudspeaker adjacent to this loudspeaker, wherein the loudspeaker arrangement comprises at least two pairs of adjacent loudspeakers with different distances between the loudspeakers of the respective pair of loudspeakers.

32. A method for providing drive signals for loudspeakers of a loudspeaker arrangement based on an audio signal associated with a virtual source, the method comprising:

determining a group of relevant loudspeakers of the loudspeaker arrangement located within a variable angular range around a position of the virtual source, wherein the variable angular range is based on a distance between the position of the virtual source and a predefined listener position wherein the variable angular range is defined by a first angle comprising a vertex at a first position of the virtual source for a first distance between the first position of the virtual source and the predefined listener position and by a second angle comprising a vertex at a second position of the virtual source for a second distance between the second position of the virtual source and the predefined listener position, wherein the first distance is different from the second distance, and wherein the first angle comprises a first angle value and the second angle comprises a second angle value, wherein the first value is different from the second value, wherein the virtual source is a focused virtual source located within an inner area of the loudspeaker arrangement;

calculating driving coefficients for the determined group of relevant loudspeakers; and providing drive signals to the group of relevant loudspeakers based on the calculated driving coefficients and the audio signal of the virtual source without providing drive signals of the virtual source to other loudspeakers than the loudspeakers of the group of relevant loudspeakers.

33. A non-transitory computer readable medium including a computer program with program code for performing, when the computer program runs on a computer or a microcontroller, a method for providing drive signals for loudspeakers of a loudspeaker arrangement based on an audio signal associated with a virtual source, the method comprising:

determining a group of relevant loudspeakers of the loudspeaker arrangement located within a variable angular range around a position of the virtual source, wherein the variable angular range is based on a distance between the position of the virtual source and a predefined listener position wherein the variable angular range is defined by a first angle comprising a vertex at a first position of the virtual source for a first distance between the first position of the virtual source and the predefined listener position and by a second angle comprising a vertex at a second position of the virtual source for a second distance between the second position of the virtual source and the predefined listener position, wherein the first distance is different from the second distance, and wherein the first angle comprises a first angle value and the second angle comprises a second angle value, wherein the first value is different from the second value, wherein the virtual source is a focused virtual source located within an inner area of the loudspeaker arrangement;

calculating driving coefficients for the determined group of relevant loudspeakers; and providing drive signals to the group of relevant loudspeakers based on the calculated driving coefficients and the audio signal of the virtual source without providing drive signals of the virtual source to other loudspeakers than the loudspeakers of the group of relevant loudspeakers.

* * * * *